United States Patent
Cai et al.

(10) Patent No.: US 12,321,350 B1
(45) Date of Patent: Jun. 3, 2025

(54) QUERY BLOCK BOUNDARY IDENTIFICATION

(71) Applicant: Snowflake Inc., Bozeman, MT (US)

(72) Inventors: Walter Zhen Cai, Seattle, WA (US); Sangyong Hwang, Sammamish, WA (US); Wesley A. Leung, Bellevue, WA (US); Sourav Sikdar, Houston, TX (US); Li Yan, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/525,296

(22) Filed: Nov. 30, 2023

(51) Int. Cl.
   G06F 16/00    (2019.01)
   *G06F 16/2452*    (2019.01)
   G06F 16/2453    (2019.01)

(52) U.S. Cl.
   CPC .... *G06F 16/24542* (2019.01); *G06F 16/2452* (2019.01)

(58) Field of Classification Search
   CPC ........... G06T 1/20; G06T 11/001; G06N 3/08; G06N 3/045; G06N 3/048; G06F 16/951; G06F 16/9038; G06F 16/583; G06F 12/1009; G06F 12/0246; G06F 2212/657; G06F 2212/1024; G06F 2212/7201; G06F 2212/1008

See application file for complete search history.

(56) References Cited

U.S. PATENT DOCUMENTS

| 10,565,123 | B2 * | 2/2020 | Song | G06F 12/1009 |
| 2015/0120770 | A1 * | 4/2015 | Obukhov | G06F 3/0605 |
| | | | | 707/758 |

* cited by examiner

*Primary Examiner* — Yicun Wu
(74) *Attorney, Agent, or Firm* — Schwegman Lundberg & Woessner, P.A.

(57) ABSTRACT

The subject technology receives a query. The subject technology generates a set of query blocks based on parsing the query. The subject technology stores query block metadata for each query block from the set of query blocks. The subject technology restores a set of logical query block boundaries. The subject technology performs a hash-based query block matching. The subject technology generates, after performing the hash-based query block matching, a final query plan. In an example, if a (same) query is executed again the same logical query blocks would produce the same metadata (e.g., identifier, name and hash). This metadata can be used to match logical query blocks between multiple executions of the same query.

20 Claims, 24 Drawing Sheets

1300

```
┌─────────────────────────────────────────────────────────────┐
│ RECEIVE A FIRST QUERY PLAN CORRESPONDING TO A QUERY AND A   │
│      JOIN ORDER HINT DESCRIBING A TARGET QUERY PLAN         │
│                           1302                              │
└─────────────────────────────────────────────────────────────┘
                              │
                              ▼
┌─────────────────────────────────────────────────────────────┐
│  GENERATE A SECOND QUERY PLAN TO CORRECT A SET OF VERTICAL  │
│ POSITIONS OF A SET OF TERMINAL NODES OF THE FIRST QUERY PLAN│
│    FOLLOWING THE JOIN ORDER HINT OF THE TARGET QUERY PLAN   │
│                           1304                              │
└─────────────────────────────────────────────────────────────┘
                              │
                              ▼
┌─────────────────────────────────────────────────────────────┐
│    GENERATE A THIRD QUERY PLAN TO CORRECT A SET OF LATERAL  │
│   POSITIONS OF THE SET OF TERMINAL NODES OF THE SECOND QUERY│
│   PLAN FOLLOWING THE JOIN ORDER HINT OF THE TARGET QUERY PLAN│
│                           1306                              │
└─────────────────────────────────────────────────────────────┘
                              │
                              ▼
┌─────────────────────────────────────────────────────────────┐
│   FOR EACH JOIN NODE FROM THE SET OF JOIN NODES OF THE THIRD│
│    QUERY PLAN, INDICATE THAT EACH JOIN NODE HAS BEEN HINTED │
│                           1308                              │
└─────────────────────────────────────────────────────────────┘
                              │
                              ▼
┌─────────────────────────────────────────────────────────────┐
│ GENERATE, AFTER EACH JOIN NODE OF THE THIRD QUERY PLAN HAS  │
│ BEEN INDICATED AS BEING HINTED, THE TARGET QUERY PLAN BASED │
│           AT LEAST IN PART ON THE THIRD QUERY PLAN          │
│                           1310                              │
└─────────────────────────────────────────────────────────────┘
```

```
SELECT * FROM (
SELECT *
FROM A, B, C
WHERE A.a1 = B.b1 AND B.b2 = C.c2 AND A.a2 < 5

UNION ALL

SELECT *
FROM A, B, C
WHERE A.a2 = B.b2 AND B.b3 = C.c3 AND B.b1 > 1
) X
WHERE X.a1 > 1;
```

```
SELECT *
FROM A LEFT OUTER JOIN B ON (A.a1 = B.b1 and A.a2 = B.b2),C
WHERE B.b3 = C.c3
AND C.c3 > 3;
```

```
SELECT ...
FROM (
SELECT ... FROM A AS A LEFT OUTER JOIN B AS B
ON ((A.A1 = B.B1) AND (A.A2 = B.B2)))
SYS_BLOCK_HASH_HCQB1 INNER JOIN C AS C
WHERE (SYS_BLOCK_HASH_HCQB1.B3 = C.C3) AND
(C.C3 > 3)
```
ID = 2

```
SELECT ...
FROM A AS A LEFT OUTER JOIN B AS B
ON ((A.A1 = B.B1) AND (A.A2 = B.B2))
```
ID = 1

2200

QUERY BLOCK BOUNDARY IDENTIFICATION

TECHNICAL FIELD

Embodiments of the disclosure relate generally to databases and, more specifically, to enabling techniques for responsive query plan stability in a database system(s).

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud database is a network-based system used for data analysis and reporting that comprises a central repository of integrated data from one or more disparate sources. A cloud database can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud database system processes the query and returns certain data according to one or more query predicates that indicate what information should be returned by the query. The data warehouse system extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIG. 13 is flow diagram illustrating operations of a database system in performing a method, in accordance with some embodiments of the present disclosure.

FIG. 15 illustrates an example query, in accordance with some embodiments of the present disclosure.

FIG. 19 illustrates an example of a query 1900, in accordance with an embodiment of the subject technology.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Figure 1:
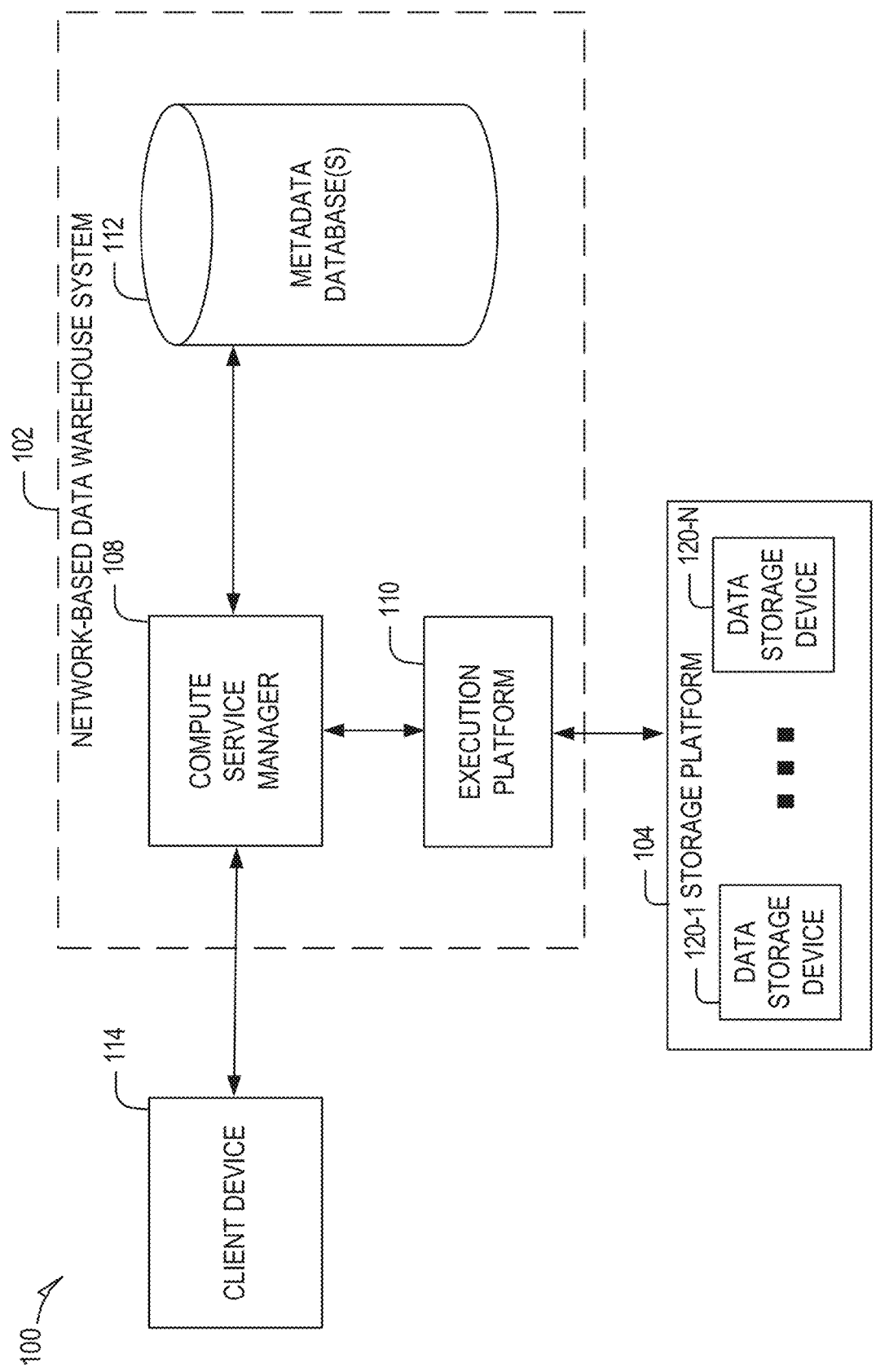
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database(s) 112 may include a summary of data stored in remote data storage systems as well as data available from a local cache. Additionally, a metadata database(s) 112 may include information regarding how data is organized in remote data storage systems (e.g., the cloud storage platform 104) and the local caches. Information stored by a metadata database(s) 112 allows systems and services to determine whether a piece of data needs to be accessed without loading or accessing the actual data from a storage device.

In an embodiment, a data structure can be utilized for storage of database metadata in the metadata database(s) 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enable the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database(s) 112 includes EP files (expression property files), where each of the EP files store a collection of expression properties about corresponding data. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan, a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database(s) 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
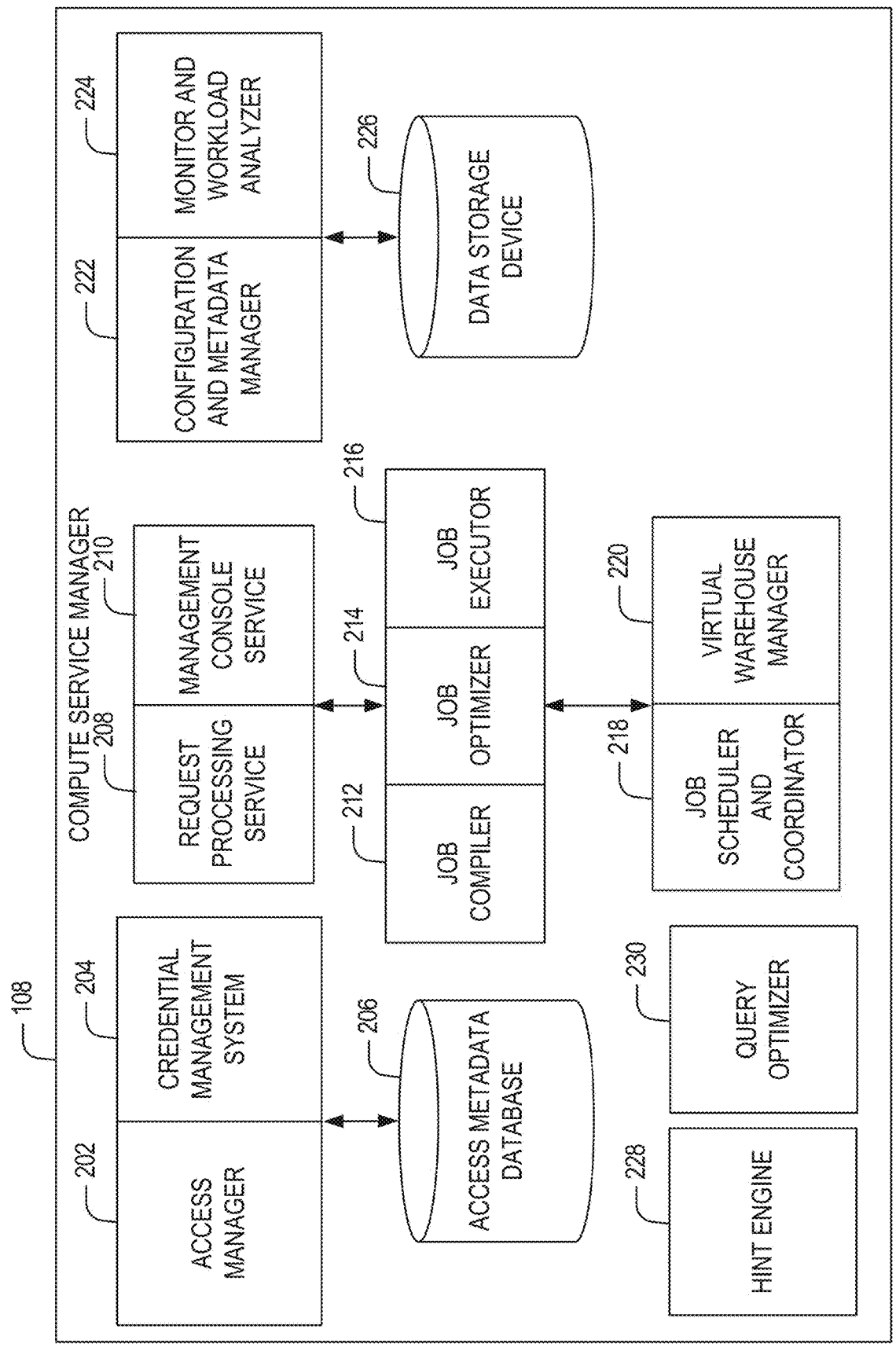
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. Alternatively or conjunctively, the job compiler 212 can generate query plans for executing received queries as discussed further herein.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In data processing systems that support SQL, a hint is often used as a directive to provide instructions to the query optimizer on how to execute a SQL query. Hints can be used to direct a query optimizer to choose a join order, choose indexes or control other performance related options. As further illustrated, the compute service manager 108 includes a hint engine 228 and a query optimizer 230. In an example, the hint engine 228 implements a join order hint application framework that helps query optimizer 230 choose a particular join order, which enables achieving automatic responsive plan stability in the subject system.

Figure 3:
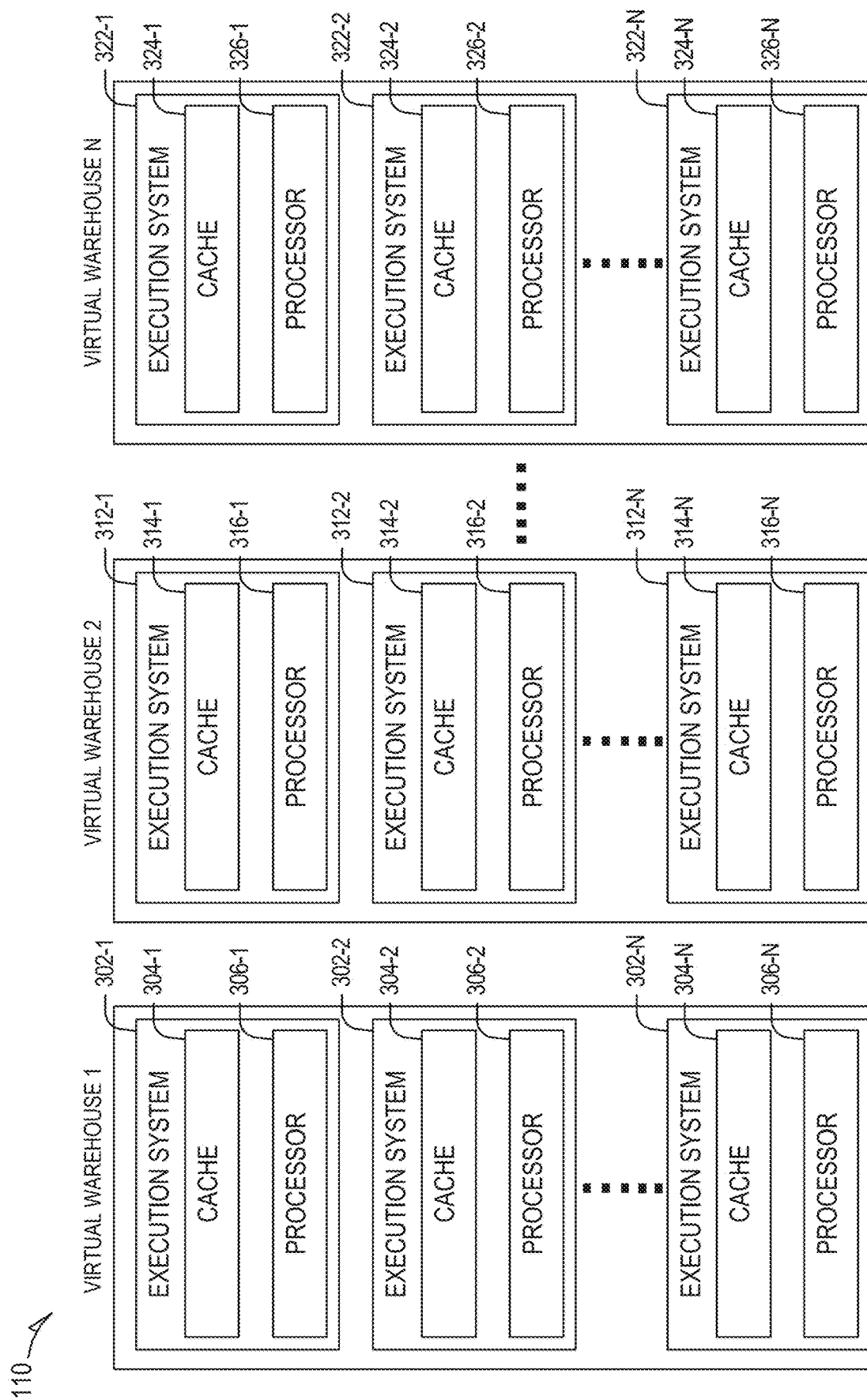
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted (e.g., shut down) when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without significantly impacting the performance observed by the existing users.

Figure 4:
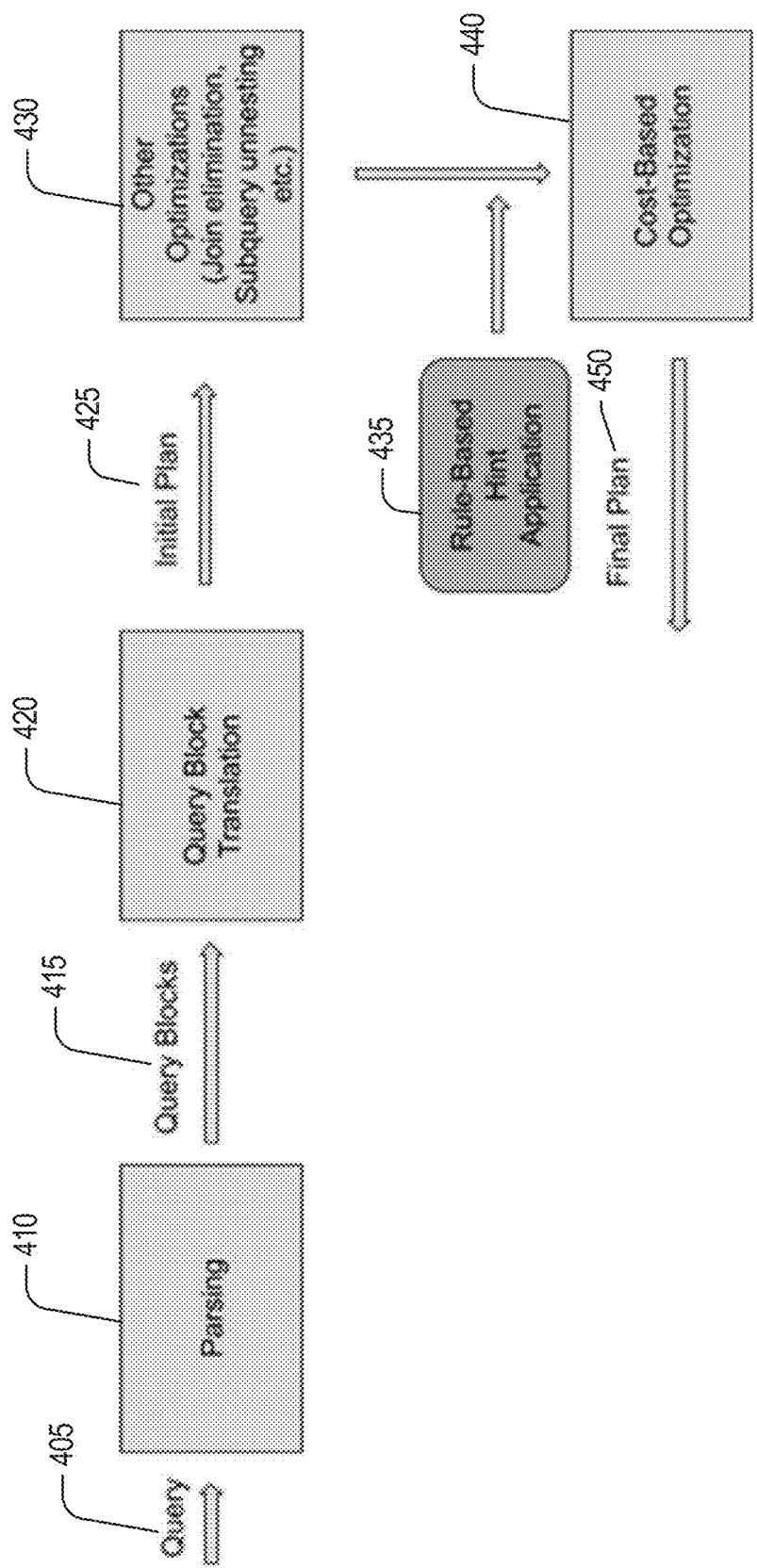
FIG. 4 illustrates an example processing flow for a set of operations of an example query compilation and query optimization involving a rule-based application, in accordance with some embodiments of the present disclosure.

FIG. 4 illustrates an example processing flow for a set of operations of an example query compilation and query optimization involving a rule-based application, in accordance with some embodiments of the present disclosure.

The following discussion relates to aspects of a rule-based hint application 435 (e.g., provided or enabled by hint engine 228).

In an implementation, join order hints can be applied any time before Cost-Based Optimization (CBO) (e.g., shown as cost-based optimization 440 in FIG. 4). CBO is an expensive step in query compilation, and is critical to choosing the final join order for a query. One fundamental goal of a hint application framework (e.g., provided by hint engine 228) is to skip this computationally expensive step.

An existing approach for join order hint application is to apply hints early in compilation at the time of Query Block (QB) translation (e.g., shown as query block translation 420 in FIG. 4) when initial query plan (e.g., initial plan 425) is constructed. One limitation of this approach is that joins introduced after QB translation are not easily supported within a given framework.

In contrast, rule-based hint application 435 applies relatively late in compilation just before CBO and overcomes the limitations of a given existing framework(s). Joins introduced after QB translation are supported within this framework. For example, this approach can support joins coming from subquery unnesting and apply hints to them.

Existing approaches typically follow a construction based approach. Hints are applied before or during the initial query plan is constructed (in a bottom up manner) from the QBs.
Input: Query Blocks
Output: Hinted Query Plan In contrast, rule-based hint application 435 employs a transformation based approach. For example, rule-based hint application 435 takes a query plan as input, applies predefined transformations or rules (commute, permute rules) present in an optimizer in a principled manner, and generates a hinted query plan corresponding to final plan 450.

Input: Query Plan with initial join order
Output: Hinted Query Plan

The following discussion relates to query blocks.

In a query compilation process shown in FIG. 4, a SQL query 405 after parsing 410 is usually broken into one or more smaller units called Query Blocks (QB) 415 where such query blocks undergo query block translation 420 to generate initial plan 425. Such QBs generally follow a tree structure, so each QB can have one or more child QBs. Each QB can be optimized independently (e.g., in other optimizations 430) before being combined to generate a complete execution plan for the query.

When discussing join order hint application, each QB can be thought of as an unit which contributes a portion or fragment in the query plan within which joins are reorderable.

The following discussion relates to join order hint syntax.

Each join node in a query plan generates a hint which is a key-value pair and follows a syntax like this:
"gbx y":{"leftAlias",
"rightAlias"}
x: Query Block (QB) identifier.
y: Unique identifier for join nodes within a QB.
leftAlias: Alias for the left child subtree of the join node.
rightAlias: Alias for the right child subtree of the join node.

If there are B blocks, the QB identifiers range from 1 to B. If there are N joins in a QB, the join identifiers range from 0 to (N-1).

Additionally, a null alias is utilized to refer to the join-tree built so far within a QB. The nodes that contribute non-null aliases are called terminal nodes (also referred to as "terminals", "nodes with aliases" or simply "nodes").

There are two types of terminal nodes in a query plan:
Leaf Node: These are data source nodes in the query plan.
Query Block Root: These are root/top nodes of a QB, where QB refers to a fragment of the query plan within which joins are reorderable.
Consider the following example query:
WITH V1 AS (SELECT
FROM T4, T5, T6
WHERE T4.c4=T5.c5 AND T5.c5=T6.c6 LIMIT 3)
SELECT*
FROM T1, T2, T3, V1
WHERE  T1.c1=T2.c2  AND  T2.c2=T3.c3  AND T3.c3=V1.c4;
Here the data sources are: T1, T2, T3, T4, T5, T6 and V1 refers to the root node (LIMIT operator) of the CTE query block.
A valid join order hint following our syntax could be:
{"qb1_0": ["T6", "T4"], "qb1_1": [null, "T5"], "qb2_0": ["V1", "T3"], "qb 2_1": ["T1", null], "qb2_2": [null, "T2"]}
The above join order hint actually describes the join order:
((T1, (((T6, T4), T5), T3)), T2)

The following discussion relates to rewrite rules.

Query compilers often rely on predefined transformations or rules. Such transformations or rules, applied in a principled manner, can be used to optimize a query plan. Rule-based hint application 435 utilizes rules used in a transformation-based query optimizer, repurposing them to achieve a join order hint application. After the query plan is processed by rule-based hint application (outputting a target query plan), a cost-based optimization 440 is skipped (e.g., forgoing performing such an optimization) which then generates a final plan 450.

Figure 5:
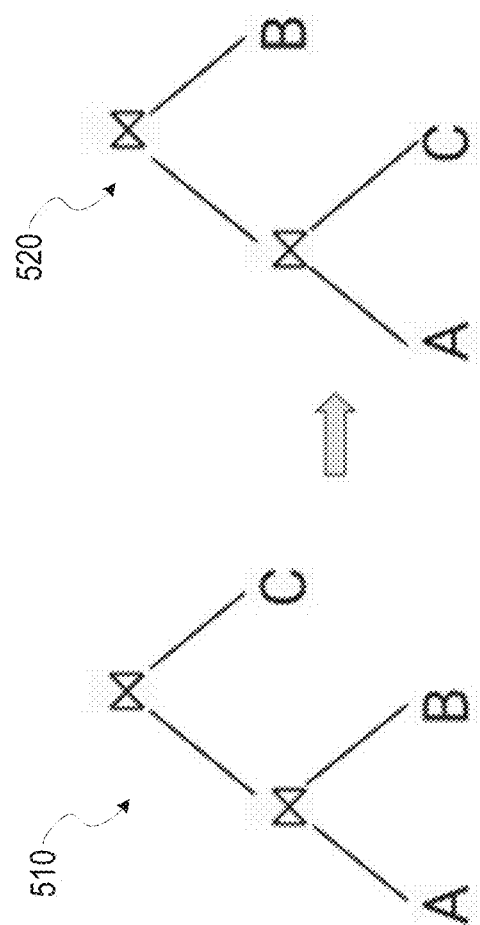
FIG. 5 illustrates an example of a join permute rule applied to a query plan in accordance with embodiments of the subject technology.

In an implementation, a hint application framework (e.g., provided by hint engine 228) relies on two rewrite rules which are discussed further below:
Join Permute Rule
Join Commute Rule FIG. 5 illustrates an example of a join permute rule applied to a query plan in accordance with embodiments of the subject technology.

As shown, the join permute rule transforms a query plan 510 of the form ((A⋈B) ⋈ C) to a query plan 520 of form ((A⋈C)⋈B) if such a transformation is valid. The following should be considered:
Only the right child of join nodes participate in permute.
B and C are the right child of their parent join nodes.
The permute increases the height of B and decreases the height of C, where height is measured from the bottom.
Height of A remains unchanged.

Figure 6:
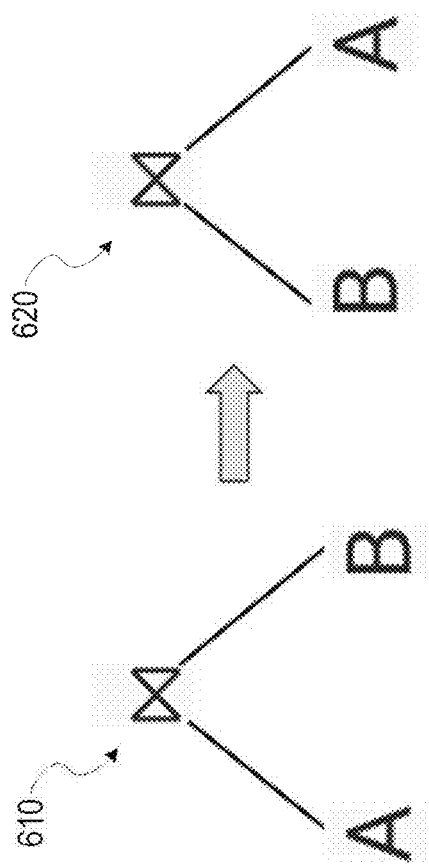
FIG. 6 illustrates an example of a join commute rule applied to a query plan in accordance with embodiments of the subject technology.

FIG. 6 illustrates an example of a join commute rule applied to a query plan in accordance with embodiments of the subject technology As shown, the join commute rule is a transformation that swaps the children of a join node while preserving the semantics. The join commute rule transforms a query plan 610 of the form (A⋈B) to a query plan 620 of a form (B⋈A) if such a transformation is valid.

The following discussion relates to various aspects involving rule-based application 435.

The following discussion relates to the inputs and outputs of rule-based hint application 435.

Figure 7:
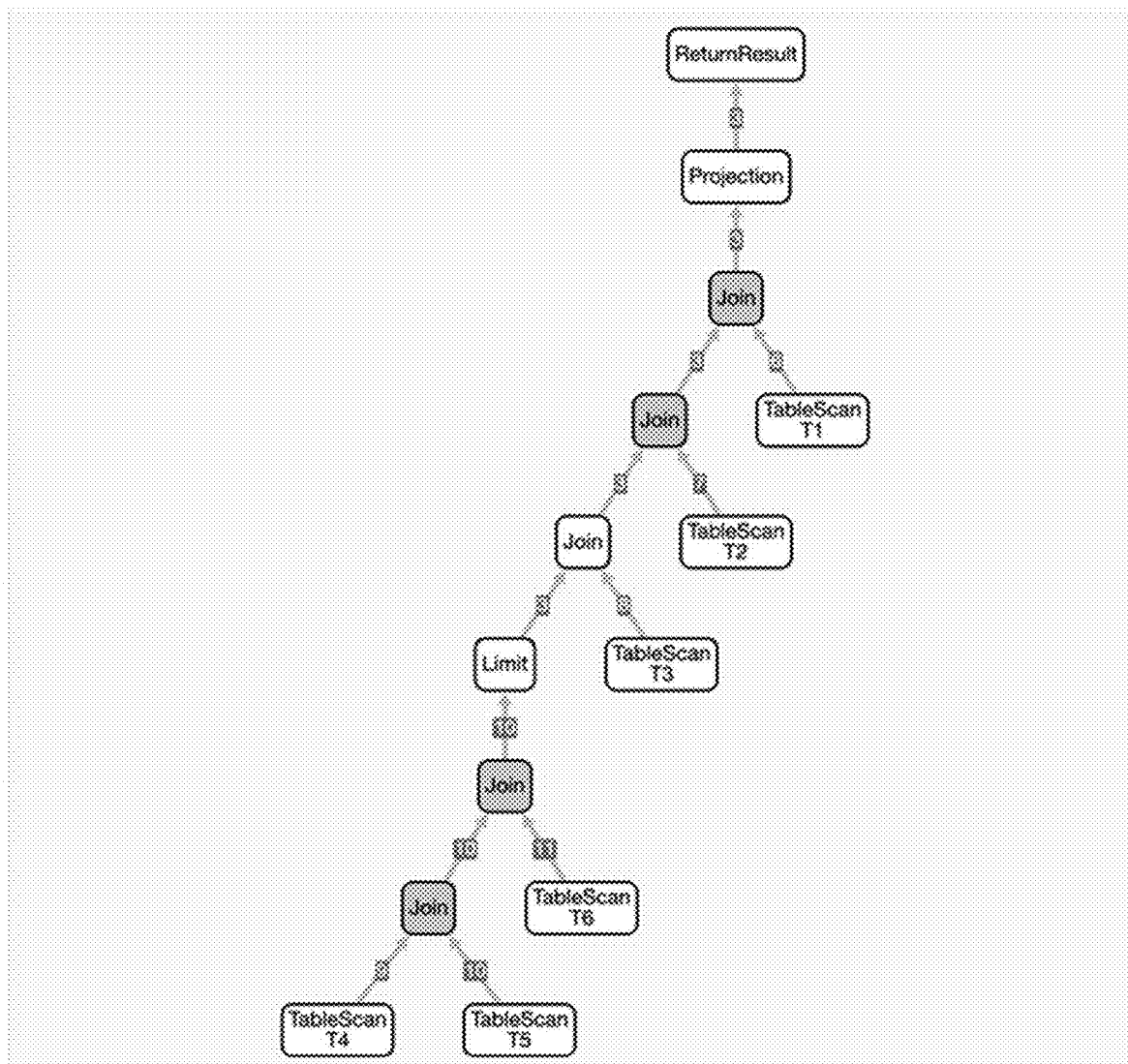
FIG. 7 illustrates an example of an input query plan with an arbitrary join order in accordance with embodiments of the subject technology.

FIG. 7 illustrates an example of an input query plan with an arbitrary join order in accordance with embodiments of the subject technology.

In an implementation, the hint application framework (e.g., provided by hint engine 228) takes as input:
A query plan with an initial join order and
A directive containing a valid join order hint describing the target query plan.
The framework applies the join order hint and outputs:
A query plan matching the specific join order instructed by the directive.
As shown, given an example query, the two inputs to rule-based hint application 435 are the following:
Query plan 700 with the initial join order: (((((T4, T5), T6), T3), T2), T1)
A directive containing a valid join order hint describing the target query plan: {"qb1_0": ["T6", "T4"], "qb1_1": [null, "T5"], "qb2_0": ["V1", "T3"], "qb2_1": ["T1", null], "qb2_2": [null, "T2"]}
The above join order hint describes the join order:
((T1, (((T6, T4), T5), T3)), T2)
The output from the framework is a query plan matching the described join order which is discussed in FIG. 8.

Figure 8:
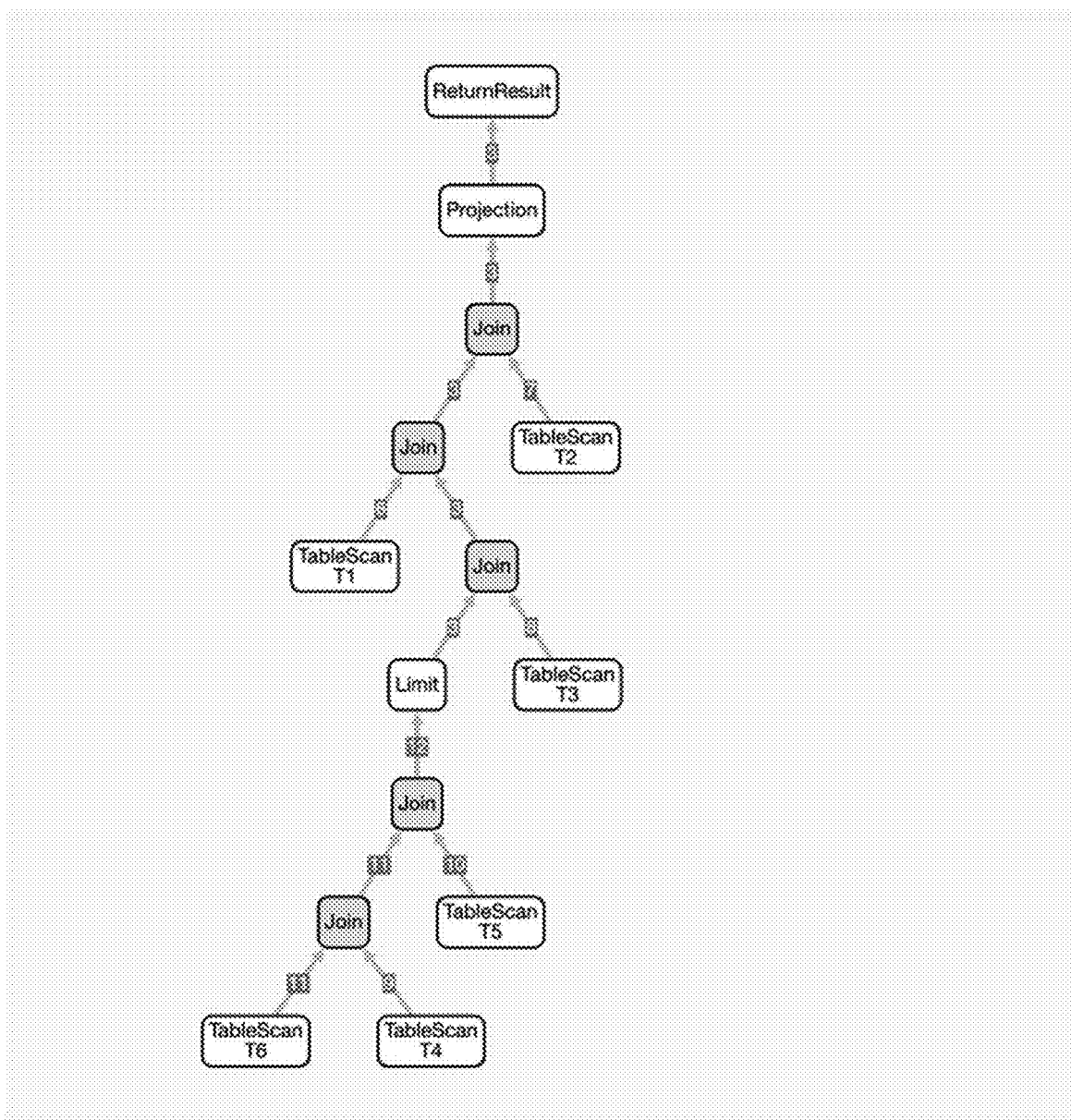
FIG. 8 illustrates an example of an output query plan matching a join order hint in accordance with embodiments of the subject technology.

FIG. 8 illustrates an example of an output query plan matching a join order hint in accordance with embodiments of the subject technology. The example in FIG. 8 continues the discussion from FIG. 7.

As shown, the expected output from rule-based hint application 435 is:
A target query plan 800 with the join order:
((T1, (((T6, T4), T5), T3)), T2)

In an implementation, the hint application framework is divided into logical steps or stages. The following discussion relates to such logical steps (or stages).

For join order hint processing, the hints in the plan directive are processed in sorted order. First, hints are sorted in the increasing order of QB identifiers. It is then further sorted, within each query block, in the increasing order of join identifiers.

The hints are processed in the sorted order to generate position metadata for each terminal node. The following metadata are maintained for terminal nodes:

Vertical Position (or Height): Height measured from the bottom.

Lateral position: Describes if a terminal is the left or right child of its parent join node.

The pair of vertical and lateral positions <Vertical, Lateral> uniquely identify the position of a terminal node in the target query plan. Moreover, the positions of a terminal node are made globally unique.

The following is an example algorithm (e.g., executed by rule-based hint application 435 or hint engine 228) to generate unique positions from directive:

Algorithm:
Initialize, curHeight=0.
Process hint fragments in the sorted order:
1. Assign curHeight as vertical position to terminals in the hint fragment.
Increment curHeight.
2. Assign lateral position to terminals.
Non-null leftAlias in the hint fragment is tagged Left Child.
Non-null rightAlias in the hint fragment is tagged Right Child.

Figure 9:
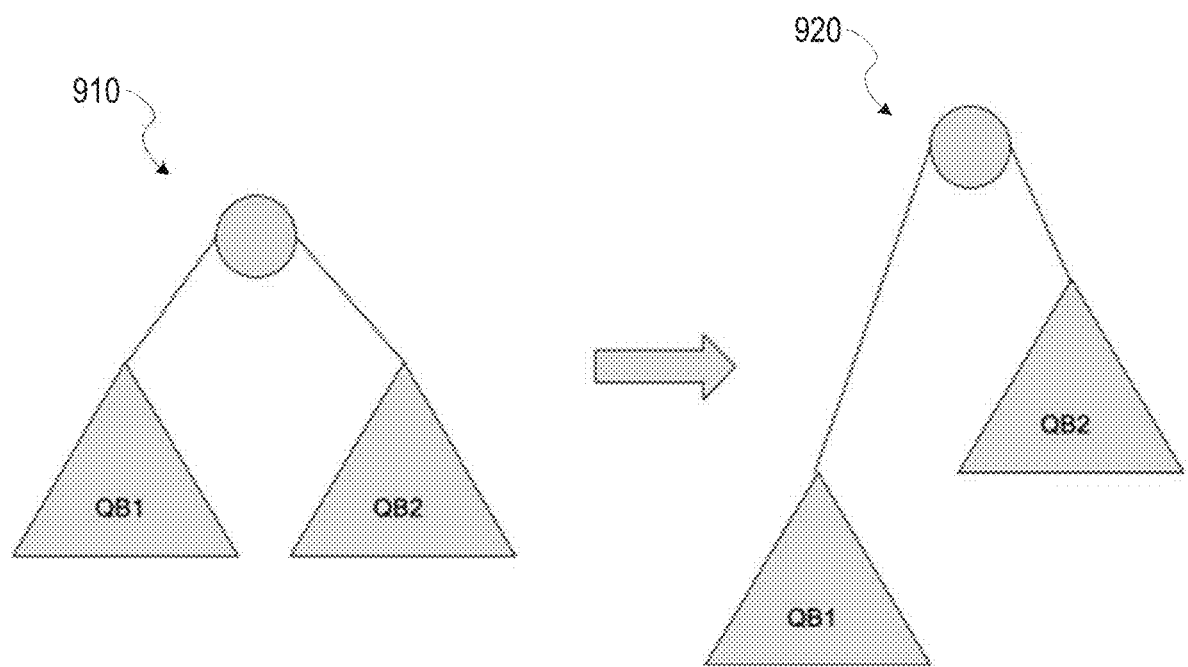
FIG. 9 illustrates an example of making vertical positions unique across an entire query plan in accordance with embodiments of the subject technology.

FIG. 9 illustrates an example of making vertical positions unique across an entire query plan in accordance with embodiments of the subject technology.

For some query plans, it might not be immediately clear how the (vertical) positions are globally unique. For example, root nodes of QB1 and QB2 are being joined together in a query plan 910.

As shown, to make vertical positions unique across the entire query plan, the aforementioned algorithm assigns terminals from QB2 greater heights than terminals in QB1 in query plan 920.

In an implementation, a set of internal metadata generated after processing the provided directive describing the target query plan, {"qb1_0": ["T6", "T4"], "qb1_1": [null, "T5"], "qb2_0": ["V1", "T3"], "qb2_1": ["T1", null], "qb2_2": [null, "T2"]}, can be represented by the following:

| Hint Fragment | Terminal Node with Alias | Vertical Position or Height | Lateral Position |
|---|---|---|---|
| "qb1_0": ["T6", "T4"] | T6 | 0 | Left Child |
|  | T4 | 0 | Right Child |
| "qb1_1": [null, T5"] | T5 | 1 | Right Child |
| "qb2_0": ["V1", "T3"] | V1 | 2 | Left Child |
|  | T3 | 2 | Right Child |
| "qb2_1": ["T1", null] | T1 | 3 | Left Child |
| "qb2_2": [null, "T2"] | T2 | 4 | Right Child |

The following discussion relates to Stage 1: Correct Vertical Positions (or Heights).

In such a first stage, a goal is to create a query plan where all terminal nodes (nodes with aliases) are placed in their correct vertical positions. The lateral positions of the terminal nodes may or may not be correct after this stage.

In an example, to place each terminal node in their correct vertical positions, the Join Permute Rule and the Join Commute Rule are applied when a set of conditions is met.

Join Permute Rule conditions:
Permute a plan fragment of the form $((A \bowtie B) \bowtie C)$ to $(A \bowtie C) \bowtie B)$, under the following condition:
Height of B is greater than the height of C.
B and C are terminals (only terminals have vertical positions stored in the metadata). Since B is at a greater height than C in the target query plan, permuting them steers terminals towards their correct heights.

Join Commute Rule conditions:
Commute a plan fragment of the form $(A \bowtie B)$ to $(B \bowtie A)$, under the following condition:
Height of A is greater than the height of B.
A and B are terminals (only terminals have vertical positions in the metadata). A needs to go higher (than B) in the target plan. After the commute, A would become the right child and become eligible for permute. Subsequently, A can be permuted to its correct height using the Join Permute Rule.

Figure 10:
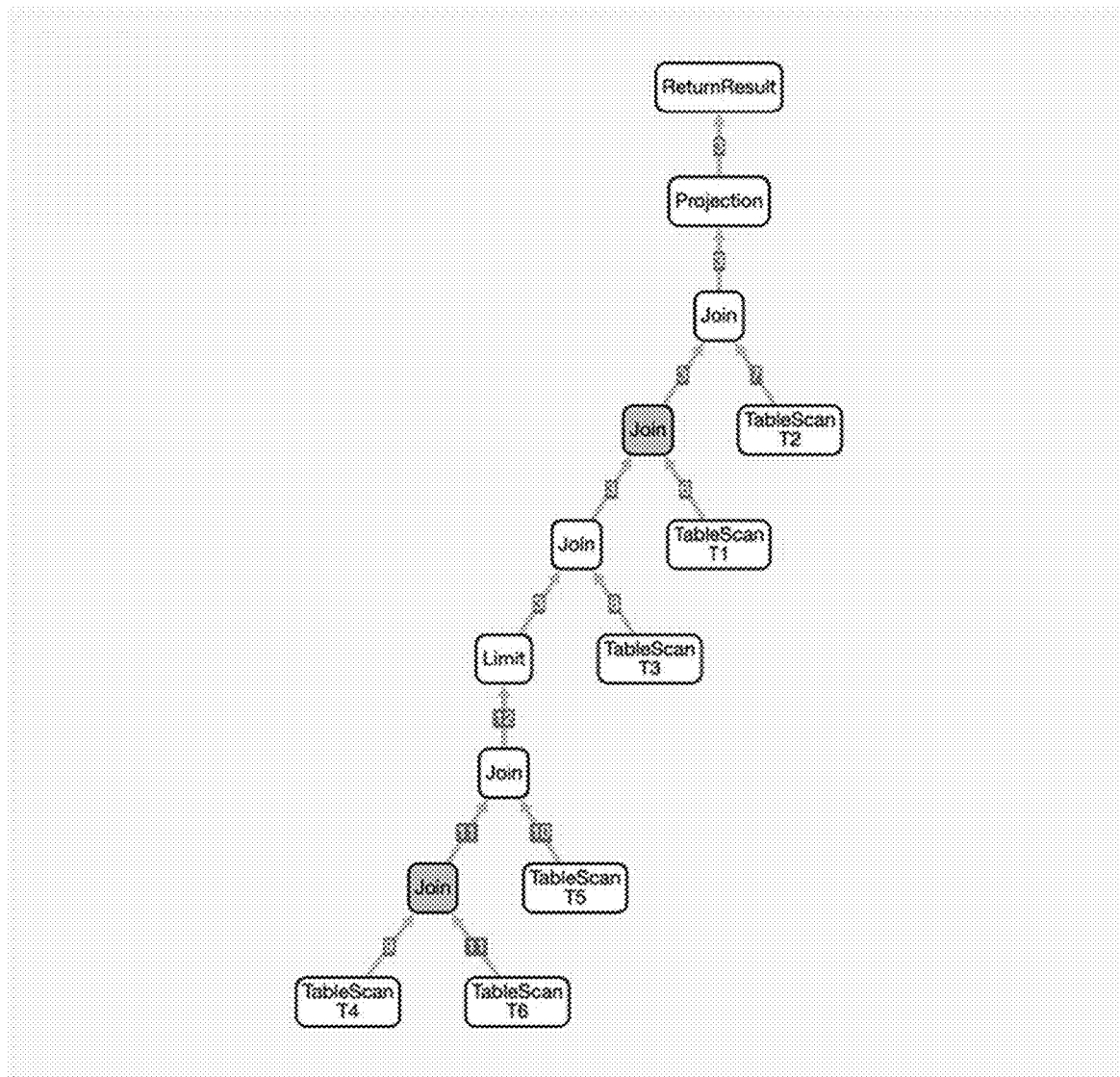
FIG. 10 illustrates an example of a query plan after a first stage of transformations in accordance with embodiments of the subject technology.

FIG. 10 illustrates an example of a query plan after a first stage of transformations in accordance with embodiments of the subject technology.

In the example of FIG. 10, a query plan 1000 is provided after transformations described above for Stage 1 are applied on the input query plan described and shown in FIG. 7. It can be noticed that all terminals are at the correct height corresponding to the target query plan. However, the terminal nodes T6, T4, and T1 are not in the correct lateral positions.

To correct such lateral positions, Stage 2: Correct Lateral Positions is discussed below.

In a second stage, a goal is to correct lateral positions of misplaced terminal nodes (if any). Since all nodes are already in the correct vertical positions, once lateral positions are corrected, the join order of the target query plan is achieved.

To place each terminal node in their correct lateral positions, the Join Commute Rule is applied when a set of conditions is met.

Join Commute Rule Conditions:
Commute a plan fragment of the form $(A \bowtie B)$ to $(B \bowtie A)$, under the following condition:
Commute a terminal with its sibling if the lateral position is incorrect.

There can be a number of scenarios: A is a terminal and the lateral position of A is incorrect; or B is a terminal and the lateral position of B is incorrect. Since the commute rule does not alter heights, vertical positions will remain preserved. Only lateral positions would be corrected if needed.

Figure 11:
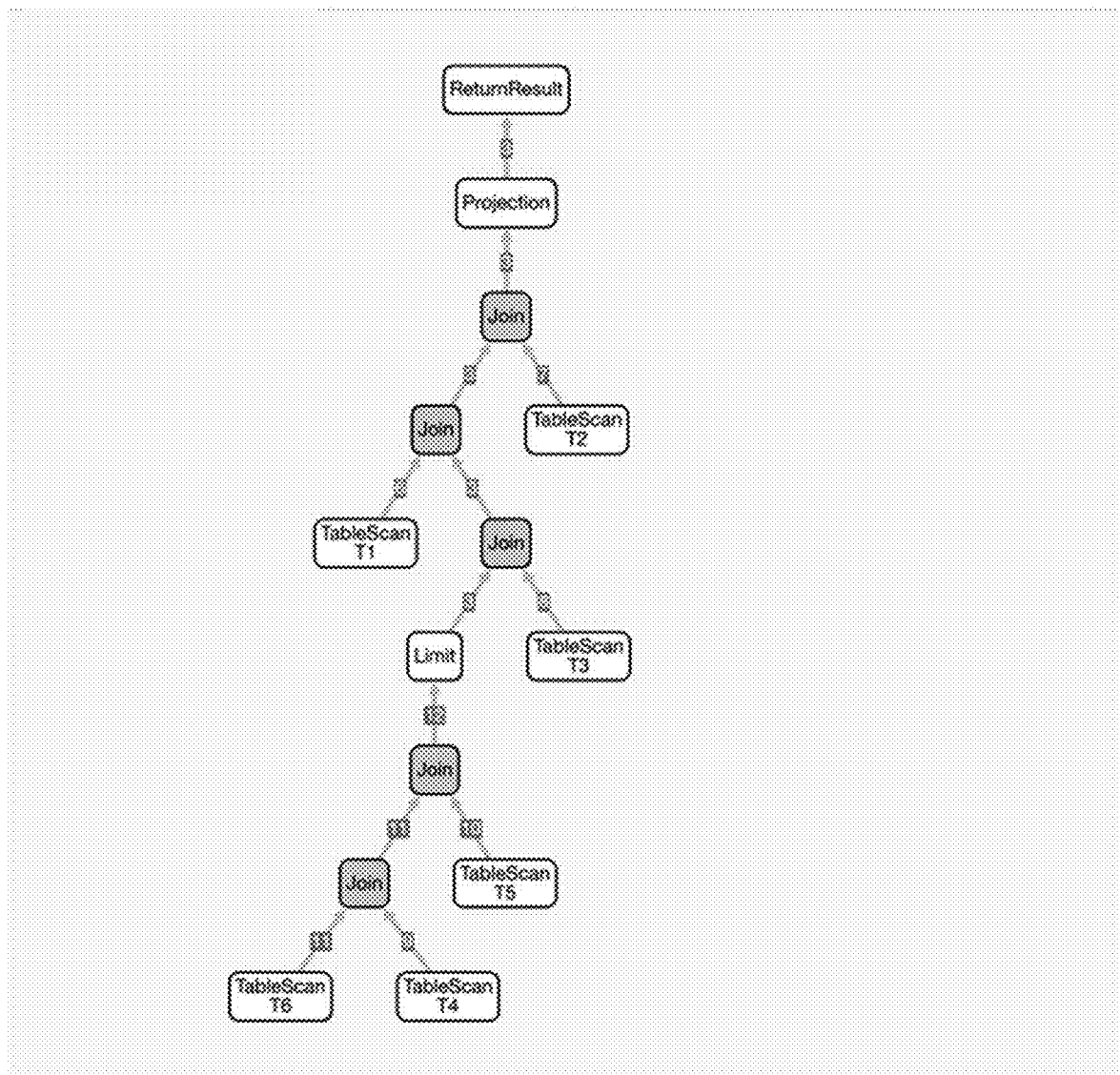
FIG. 11 illustrates an example of a query plan after a second stage of transformations in accordance with embodiments of the subject technology.

FIG. 11 illustrates an example of a query plan after a second stage of transformations in accordance with embodiments of the subject technology.

As shown, query plan 1100 includes lateral positions of the terminal nodes T6, T4, and T1 that are corrected in this second stage.

The following discussion relates to Stage 3: Mark Joins As Hinted.

Upon successful application of join order hints (in Stages 1 and 2 discussed above), the join nodes are marked as hinted in the final stage (e.g., third stage).

In a third stage, no transformations (permute or commute) are applied, only joins are marked as hinted, shown by a visual change (color change) in the join nodes of FIG. 12 as discussed below.

Figure 12:
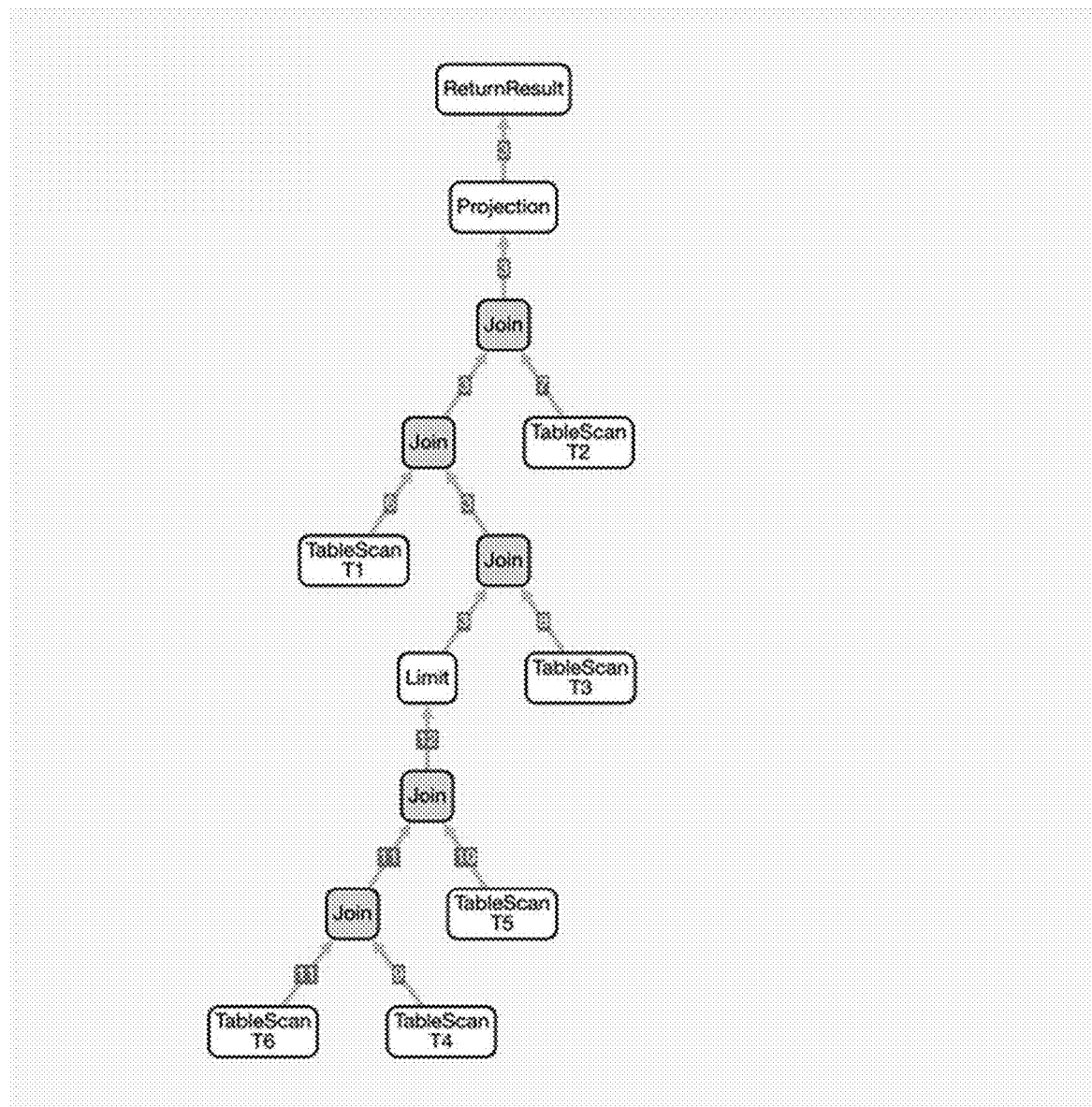
FIG. 12 illustrates an example of a query plan after joins are marked hinted in a third stage in accordance with embodiments of the subject technology.

FIG. 12 illustrates an example of a query plan after joins are marked hinted in a third stage in accordance with embodiments of the subject technology.

As shown, a final query plan 1200 matches the target query plan 800 with the target join order with all join nodes marked as hinted:

((T1, (((T6, T4), T5), T3)), T2)

This (Stage 3) ensures that any subsequent join order related optimization in the compiler (for example cost-based optimization, and the like) does not change the join order generated by rule-based hint application 435 and such expensive optimizations can often be completely skipped.

FIG. 13 is flow diagram illustrating operations of a database system in performing a method, in accordance with some embodiments of the present disclosure. The method 1300 may be embodied in computer-readable instructions for execution by one or more hardware components (e.g., one or more processors) such that the operations of the method 1300 may be performed by components of network-based data warehouse system 102, such as components of the compute service manager 108. Accordingly, the method 1300 is described below, by way of example with reference thereto. However, it shall be appreciated that the method 1300 may be deployed on various other hardware configurations and is not intended to be limited to deployment within the network-based data warehouse system 102.

At operation 1302, the hint engine 228 receives a first query plan corresponding to a query, the first query plan comprising a set of join nodes, and a join order hint of a target query plan, each join node of the target query plan associated with a hint. At operation 1304, the hint engine 228 generates a second query plan to correct a set of vertical positions of a set of terminal nodes of the first query plan following the join order hint of the target query plan. At operation 1306, the hint engine 228 generates a third query plan to correct a set of lateral positions of the set of terminal nodes of the second query plan following the join order hint of the target query plan. At operation 1308, the hint engine 228, for each join node from the set of join nodes of the third query plan, indicating that each join node has been hinted. At operation 1310, the hint engine 228 generates, after each join node of the third query plan has been indicated as being hinted, the target query plan based at least in part on the third query plan. In an embodiment, the hint engine 228 does not perform any operations involving bushy plans.

Existing implementations of join order hints can rely on query block boundaries. This can introduce a restriction (e.g., for a provided hint framework) in which hints can be required to be generated and applied before or during query block translation.

In an example, plan stability can require hints (e.g., information for query optimization during query compilation) to be generated and applied after query block translation on a query plan. After query block translation is done, the query blocks may no longer exist or not be available. To generate and apply hints after query block translation, one approach could be to restore the query block boundaries on a query plan. Embodiments of the subject technology provide a join order hint framework to support plan stability in the subject system.

The following discussion relates to query block boundary identification.

Optimizer hints are a useful tool in data processing systems-specifically in query optimization. Hints are used to provide special directives to a data processing system to control the execution plan for a SQL query. Common database hints include directives for index usage, join orders for the execution plan, join algorithm selection (e.g. nested loop, sort-merge, hash join, etc.), cardinality or cost estimates, and the like.

Hints in data processing systems are often defined using query block boundaries-such hints are referred to as query block hints. These hints can be used to optimize specific query blocks during query optimization. Hints can be grouped in two broad categories-user provided hints and system generated hints.

User Provided Hints: These hints are specified explicitly by the user in the query. User provided hints are usually expressed using the initial query block boundaries present in the query. The initial query block boundaries for a query can change due to different transformations during the query compilation process. Usually in a compiler there are many transformations that can change query block boundaries. For example, transformation rules for outer join resolution (converts outer joins to inner joins), limit pushdown (pushes limit operator below join node) are capable of changing block boundaries. Since users generally do not have control over how the compiler uses different transformations, users can not have prior knowledge about how the transformed query block boundaries would look like. As a result, users generally can not provide hints for transformed query block boundaries.

System Generated Hints: System generated hints, in contrast, are hints automatically generated by a data processing system. The system analyzes the current execution of a query and generates hints aimed at improving future executions of the same query. These hints are not restricted to the initial query block boundaries present in the query, and can be expressed using transformed query block boundaries, too. For example, consider join order hints, generated from the current execution of a query, describing the final join order chosen by the query optimizer. The join order hints can be utilized in future executions. The query compiler can use different transformations that change the initial query block boundaries before it produces the final join order. Naturally, the final join order is expressed using transformed query block boundaries. To utilize such system generated hints, from one execution to another, the system needs to identify transformed query block boundaries without ambiguity.

The following discussion describes methods to unambiguously identify query block boundaries at any stage of query compilation. These methods are utilized by data processing systems that support system generated hints on transformed query block boundaries.

Figure 14:
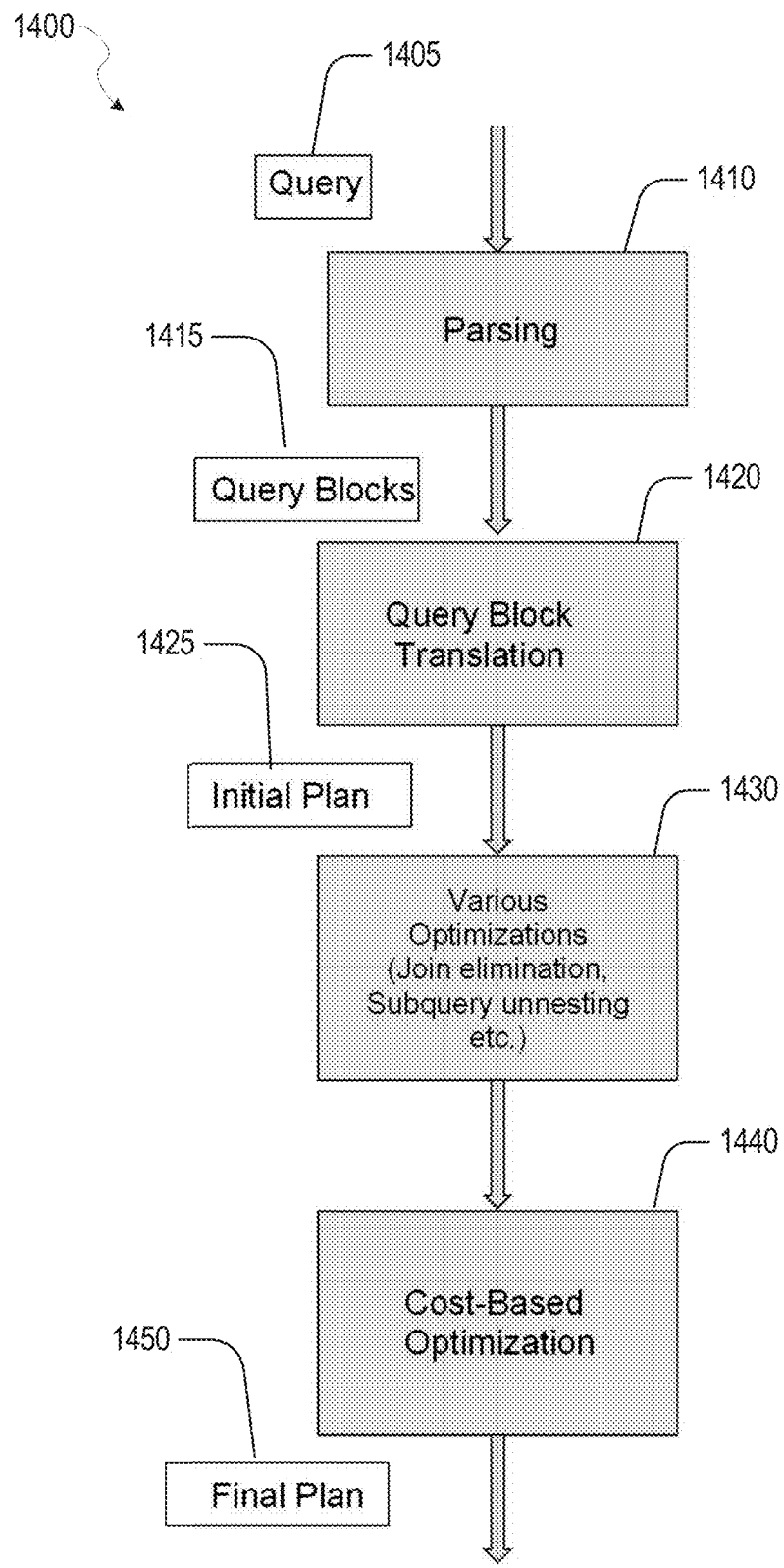
FIG. 14 illustrates an example processing flow for a set of operations (e.g., various stages) of an example query compilation and query optimization involving join order hints for stable plans, in accordance with some embodiments of the present disclosure.

FIG. 14 illustrates an example processing flow for a set of operations (e.g., various stages) of an example query compilation and query optimization involving join order hints for stable plans, in accordance with some embodiments of the present disclosure.

In a query compilation process shown in FIG. 14, a SQL query 1405 after parsing 1410 is usually broken into one or more smaller units called query blocks (QB) 1415 where such query blocks undergo query block translation 1420 to generate initial plan 1425. Such QBs generally follow a tree structure, so each QB can have one or more child QBs. Each QB can be optimized independently (e.g., in other optimizations 1430) before being combined to generate a complete execution plan for the query. A cost-based optimization (CBO) (e.g., shown as cost-based optimization 1440 in FIG. 14) can be a computationally expensive stop in query compilation, and, after performing the CBO, a final plan 1450 is generated.

It is appreciated that stages (e.g., operations discussed above) after query block translation 1420 do not maintain query block boundaries.

Embodiments of the subject technology identify query block boundaries using the following steps:
  Store query block boundary metadata before query block translation.
  Restore logical query block boundaries after query block translation.
  Hash-based query block matching between logical query blocks with parse-tree query blocks FIG. 15 illustrates an example query, in accordance with some embodiments of the present disclosure.

The discussions further below related to the aforementioned steps for identifying query block boundaries may refer to query 1500 shown in FIG. 15, which includes several SQL statements. As shown, query 1500 includes the following statements:

SELECT*FROM (
SELECT*
FROM A, B, C
WHERE A.a1=B.b1 AND B.b2=C.c2 AND A.a2<5
UNION ALL
SELECT*
FROM A, B, C
WHERE A.a2=B.b2 AND B.b3=C.c3 AND B.b1>1)
X
WHERE X.a1>1;

The following discussion relates to storing query block boundary metadata.

A SQL query after parsing is broken into one or more smaller units called query blocks. Such smaller units are also referred to as parse-tree query blocks. The query blocks follow a tree structure, so each query block can have one or more child query blocks. Those child query blocks can have children of their own, and any subsequent children can have child query block(s), and so on.

Each query block is assigned a globally unique identifier (or ID), usually an integer value. The identifier assignment is deterministic—this ensures that if the same query is parsed again the same query blocks get the same identifiers.

The identifier assignment also follows a topological order—this ensures the identifier value of a parent query block is always higher than all of its children query blocks. For a query that generates N parse-tree query blocks, they are assigned integer identifiers in the range [1, N].

The following discussion relates to query block boundary identification.

Each query block is assigned a globally unique name. If the name for a query block is already provided by the user, then that name is used. For other query blocks, a unique name can be generated.

It is not assumed that tables present in different query blocks of a SQL query have unique names. In case tables in different query blocks have the same name, they are disambiguated by generating unique names for them. Generating a unique name is deterministic—this ensures that if the same query is parsed again the tables in different query blocks are disambiguated consistently.

Each query block can be hashed to a unique hash code. Each query block is uniquely identified by all the aliases inside it. This includes two types of aliases:
  i) Aliases for data sources within the query block.
  ii) Child query block aliases.

In an implementation, a hashing mechanism takes the set of all aliases, processes them sequentially in lexicographical (or dictionary) order, and generates a unique hash for the query block. Any state-of-art hashing function that can hash a list of strings can be used. Hash functions that are quick to compute are preferred.

A unique name for a query block can be generated utilizing the hash of the query block—the name SYS_BLOCK_HASH_<HASH>can be assigned to the query block—this is sufficient as the hash for a query block is unique. In this example, <HASH>represents the actual hashcode computed for the query block.

Prior approaches can often require unparsing of the parse-tree query blocks before hashing. Unparsing is computationally costly and can add significant overhead to hashing. The aforementioned hashing mechanism can be faster as it does not rely on unparsing.

For each parse tree query block, this metadata <Identifier, HashCode, Name> is stored for usage in subsequent stages of compilation.

Figure 16:
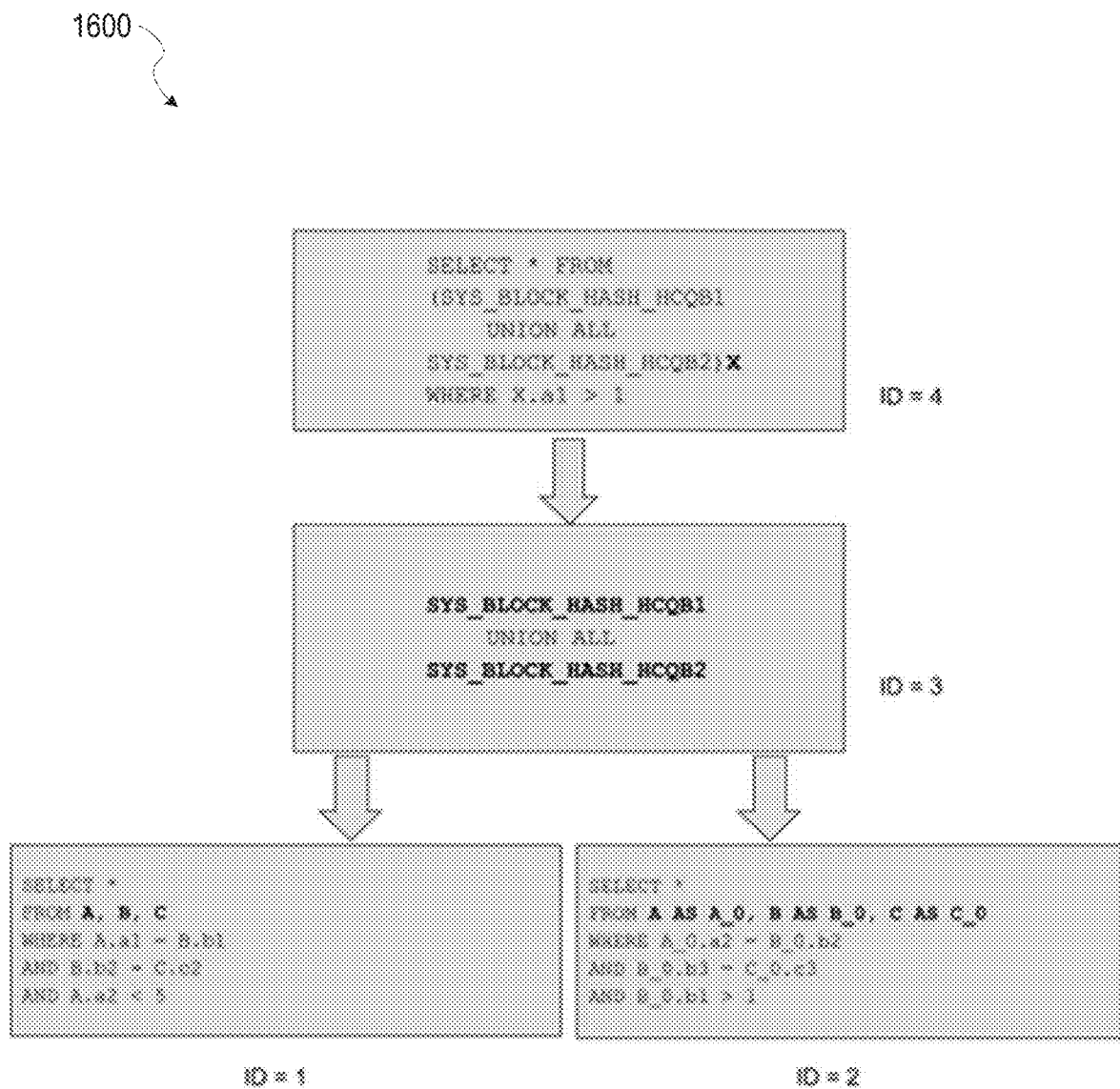
FIG. 16 illustrates an example diagram of a parent-child relationship between query blocks, in accordance with an embodiment of the subject technology.

FIG. 16 illustrates an example diagram of a parent-child relationship between query blocks, in accordance with an embodiment of the subject technology.

As shown, a set of query blocks 1600 in which each query block includes a particular identifier (ID). FIG. 16 shows a representation of parse-tree query blocks of query 1500 from FIG. 15. Each arrow points from a parent query block to a child query block.

The parse-tree query blocks are assigned IDs from [1-4]. Note the topological order is maintained, and each parent query block has a higher ID than all of its children.

The two child query blocks of the UNION ALL query block have the same set of table names {A, B, C}. Thus, the table names in one query block {ID=2} are disambiguated by making them unique {A_0, B_0, C_0}.

The user provided the name X for the UNION ALL block. For all other blocks, unique names are assigned using hash codes.

The hash codes for individual query blocks are computed, using a hashing function H( ), as follows:
  ID=1, the data source aliases are={A,B,C} and
  child query block aliases are empty.
  Hence, hash is computed as H ({A,B,C}).
  Let the hash code be represented as HCQB1 for readability (read as hash code of the
  query block with ID=1)
  ID=2, the data source aliases are={A_0,B_0,C_0} and
  child query block aliases are empty.
  Hence, hash is computed as H ({A_0,B_0,C_0}).
  Let the hash code be represented as HCQB2 for readability (read as hash code of the query block with ID=2).
  ID=3, the data source aliases are empty and
  child query block aliases are
  ={SYS_BLOCK_HASH_HCQB1,SYS_BLOCK_HASH_HCQB2}
  Hence, hash is computed as
  H ({SYS_BLOCK_HASH_HCQB1,SYS_BLOCK_HASH_HCQB2}).
  Let the hash code be represented as HCQB3 for readability (read as hash code of the query block with ID=3).
  ID=4, the data source aliases are empty and
  child query block aliases are={X}
  Hence, hash is computed as H ({X}).
  Let the hash code be represented as HCQB4 for readability (read as hash code of the query block with ID=4).

The following metadata is stored for usage in subsequent stages of compilation:

| Identifier | HashCode | Name/Alias |
|---|---|---|
| 1 | H({A, B, C}) = HCQB1 | SYS_BLOCK_HASH_HCQB1 |
| 2 | H({A_0, B_0, C_0}) = HCQB2 | SYS_BLOCK_HASH_HCQB2 |
| 3 | H({SYS_BLOCK_HASH_HCQB1, SYS_BLOCK_HASH_HCQB2}) = HCQB3 | X |
| 4 | H({X}) = HCQB4 | SYS_BLOCK_HASH_HCQB4 |

The following discussion relates to restoring logical query block boundaries.

Prior approaches can maintain the query block boundaries throughout the query compilation process. Such approaches can require transformation rules to monitor changes in block boundaries, and update the block boundaries dynamically upon any change. Usually in a compiler there are many transformations that can change query block boundaries. For example, transformation rules for outer join resolution (converts outer joins to inner joins), limit pushdown (pushes limit operator below join node) are capable of changing block boundaries. Maintaining the block boundaries through the compilation process incurs additional overhead for all the transformations.

The subject technology can provide improvements upon the aforementioned prior approaches by forgoing explicitly maintaining query block boundaries. In an example, query block boundary information is not maintained after query block translation has completed and the initial query plan is generated. Instead, the query block boundaries are reconstructed on demand to support hints. This approach reduces overhead for transformation rules as they do not need to maintain query block boundaries.

In an implementation, a subset of query plan nodes (called "query block roots") is sufficient to restore the query block boundaries. Each query block root node represents a fragment or region of the query plan within which joins are reorderable. Since these are not parse-tree query blocks, rather logically defined boundaries on a query plan, these are referred to as logical query blocks.

The subject system identifies the set of query block roots by generating the join graphs from the current query plan. These roots are not explicitly maintained through the compilation process, rather identified on demand just before hint generation (or application). This approach does not incur any overhead for maintaining the root nodes, but incurs one time cost of generating the join graphs if/when hints are generated (or applied).

With the set of the root nodes, the query block boundaries can be easily constructed using the following algorithm. Each query block boundary defines a logical query block represented by the root node.

In an implementation, the following is a description of an algorithm: Start from a root node, keep visiting its descendant nodes (children nodes, children of children nodes, and so on) until other roots are encountered. All the nodes visited belong to the same logical query block, and the logical query block is represented by the root node.

The logical query blocks also follow a tree structure, so each logical query block can have one or more child logical query blocks. Those child logical query blocks can have children of their own and so on.

Figure 17:
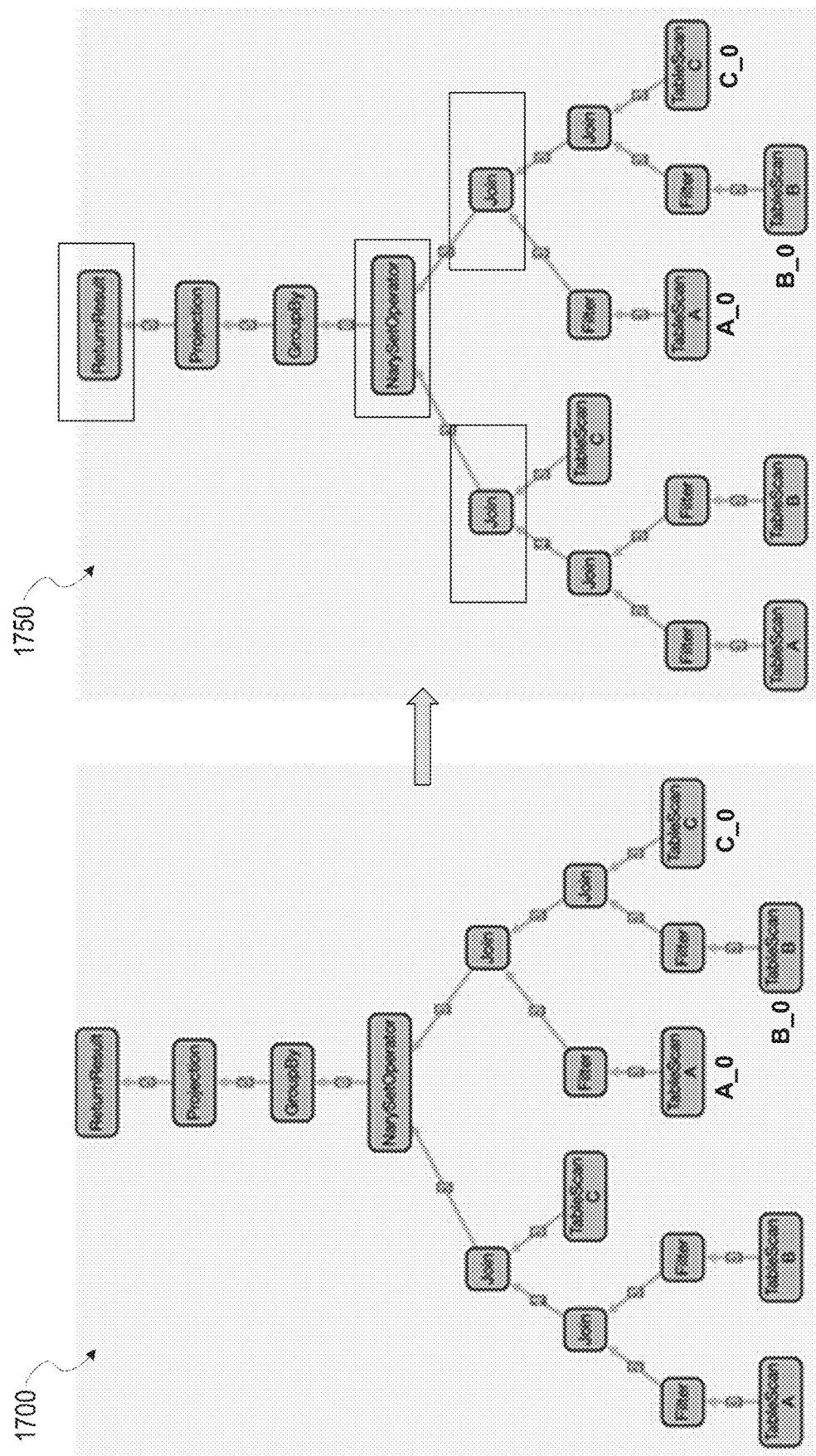
FIG. 17 illustrates an example of identifying query block roots for a final query plan, in accordance with an embodiment of the subject technology.

FIG. 17 illustrates an example of identifying query block roots for a final query plan, in accordance with an embodiment of the subject technology.

In FIG. 17, four query block roots are annotated on the final query plan for query 1500. The QueryPlanNodeReturnResult node represents the outermost query block by default. Next, the QueryPlanNodeNarySetOperator node is considered as root. Finally, both children of the set operator node are also considered as roots.

In the example of FIG. 17, tree structure 1700 represents a final query plan for query 1500. In tree structure 1750, four query plan nodes are annotated as query block roots (shown with surrounding boxes).

Figure 18:
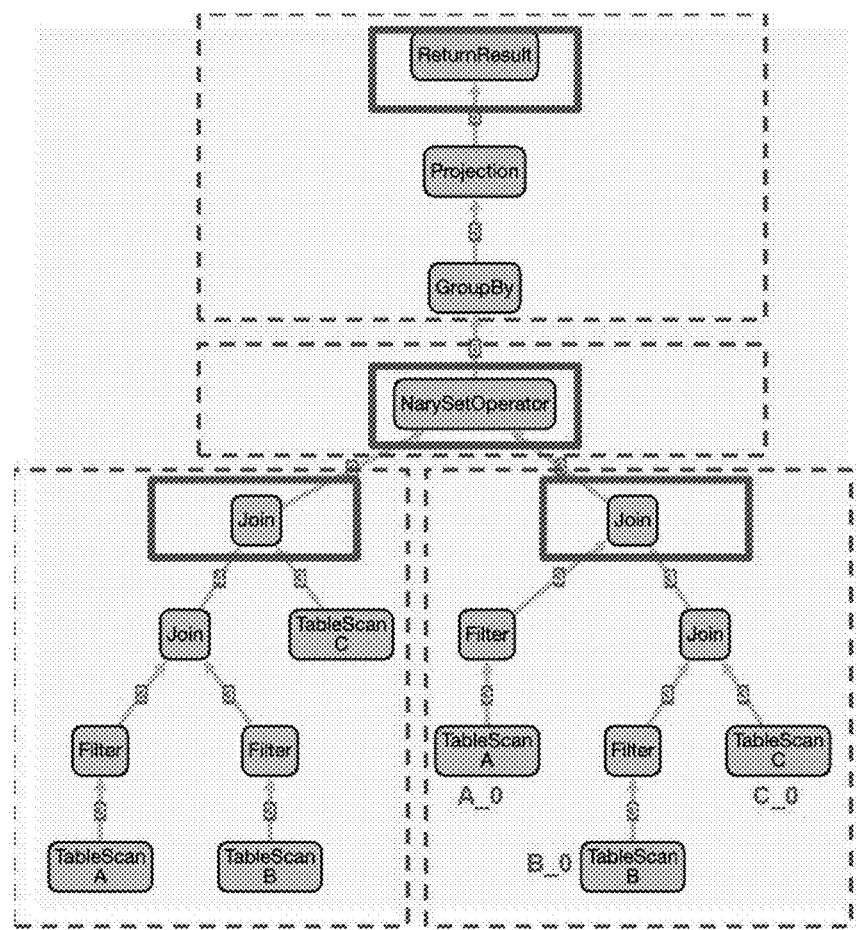
FIG. 18 illustrates example query block boundaries, in accordance with an embodiment of the subject technology.

FIG. 18 illustrates example query block boundaries, in accordance with an embodiment of the subject technology.

In tree structure 1800, the query block boundaries are identified using the set of four root nodes and the aforementioned algorithm. Each query block boundary defines a logical query block, hence there are four logical query blocks.

In the example of FIG. 18, the query block boundaries (dashed boxes) are constructed using the query block roots (solid boxes) for query 1500.

The following discussion relates to hash-based query block matching.

Each logical query block can be hashed to a unique hashcode using all the aliases inside it. This includes two types of aliases:

i) Aliases for data sources within the logical query block.
ii) Child logical query block aliases.

The hashing mechanism takes the set of all aliases, processes them sequentially in lexicographical (or dictionary) order, and generates a unique hash for the logical query block. The same hash function used to hash parse-tree query blocks must be used for hashing logical query blocks. The hashing mechanism does not require unparsing of the logical query blocks.

The hashcode of a logical query block is looked up in the previously stored metadata for the parse-tree query blocks of the form <Identifier, HashCode, Name>.

If the lookup is successful, and a matching hashcode is found, the logical query block is then given the same identifier and same alias as that of the matching parse-tree query block. A matching hashcode implies the query block boundary did not change during various transformations.

If the lookup is unsuccessful, and a matching hashcode is not found, the logical query block is treated as a new block. A hashcode with no match implies the query block boundary changed during query compilation. This new logical query block is then given a new unique identifier outside the range used up by parse-tree query blocks. As parse-tree query blocks were assigned identifiers in the range [1, N], the new logical query blocks are assigned identifiers (ID) in the range [N+1, ∞). The identifier assignment follows a topological order—this ensures the identifier value of a parent logical query block is always higher than all of its children logical query blocks. The new logical query blocks are also given a globally unique alias SYS_LOGICAL_BLOCK_HASH_<HASH>—this is sufficient as the hash for a logical query block is unique. In this example, <HASH> represents the actual hashcode computed for the logical query block.

The logical query blocks are processed in a topological order during hash-based matching. This ensures that when a parent logical query block is processed for hash-based matching, all of its children have already completed hash-based matching. In an example, this is required since computing hashcodes of parent logical query blocks depend on the names of its child logical query blocks.

The hashing mechanism for logical query blocks is robust against constant folding. If a portion of the query plan is constant-folded and replaced by a row generator (producing the constant), the row generator remembers the aliases that it replaced. This ensures the logical query block generates the same hash with or without data-dependent constant folding.

The hashing mechanism is agnostic to the join order within the logical query block. This ensures that the logical query blocks generate the same hashcode independent of the join order inside the logical query block.

It is appreciated that if a query is executed again the same logical query blocks would produce the same metadata (e.g., identifier, name and hash). In an implementation, this metadata can be used to match logical query blocks between multiple executions of the same query.

In an embodiment, a same query included in different executions (e.g., multiple executing instances of the same query) can be determined based on matching hash values (e.g., hash codes) between instances of the multiple executing same query. For example, the hash value of one instance of the same query (e.g., a first execution of the same query) can be matched to the hash value of another different instance of the same query (e.g., a second execution of the same query). Moreover, it is appreciated that query blocks can be matched across executions in this manner e.g., by matching query blocks of instances of the same query using respective query block hash values of each instance in an implementation.

The following are additional discussions related to query 1500.

The four (4) logical query blocks are processed in a topological order. First, the logical query block on the first branch of Nary SetOperator is processed. In this logical query block, the data source aliases are={A,B,C} and child logical query block aliases are empty. The hash is computed as H ({A,B,C}). A matching hashcode is found in the metadata. So, this logical query block is assigned ID=1 and given name SYS_BLOCK_HASH_HCQB1, Second, the logical query block on the second branch of NarySetOperator is processed. In this logical query block, the data source aliases are={A_0,B_0,C_0} and child logical query block aliases are empty. The hash is computed as H ({A_0,B_0,C_0}). A matching hashcode is found in the metadata. So, this logical query block is assigned ID=2 and given name SYS_BLOCK_HASH_HCQB2.

Next, the UNION ALL logical query block rooted at Nary SetOperator is processed. In this logical query block, the data source aliases are empty and child logical query block aliases are={SYS_BLOCK_HASH_HCQB1, SYS_BLOCK_HASH_HCQB2}. The hash is computed as H ({SYS_BLOCK_HASH_HCQB1, SYS_BLOCK_HASH_HCQB2}). A matching hashcode is found in the metadata. So, this logical query block is assigned ID=3 and given name X.

Finally, the topmost logical query block is processed. In this logical query block, the data source aliases are empty and child logical query block aliases are={X}. The hash is computed as H ({X}). A matching hashcode is found in the metadata. In this example, this logical query block is assigned ID=4 and given name SYS_BLOCK_HASH_HCQB4.

For example query 1500, no query block boundaries changed during query compilation. As a result, a perfect mapping can be established between the four parse-tree query blocks and four logical query blocks. Another example is presented later where a perfect mapping doesn't exist between parse-tree query blocks and logical query blocks.

The following discussion relates to a second query (e.g., query 1900 of FIG. 19). In particular, query 1900 represents an SQL query where logical query blocks are different from parse-tree query blocks.

FIG. 19 illustrates an example of a query 1900, in accordance with an embodiment of the subject technology.

Figure 20:
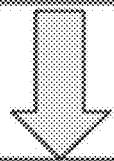
FIG. 20 illustrates an example representation of parse-tree query blocks of the query 1900 of FIG. 19, in accordance with an embodiment of the subject technology.

FIG. 20 illustrates an example representation of parse-tree query blocks of the query 1900 of FIG. 19, in accordance with an embodiment of the subject technology.

For storing query block boundary metadata of query 1900, upon parsing of query 1900, two parse-tree query blocks are generated as shown in FIG. 20. In this example, an arrow points from a parent query block to a child query block.

The first query block represents a left outer join between data sources A and B. This query block is given a globally unique identifier ID=1. This query block has two data source aliases {A, B} and no child query block alias. Hence, the hash is computed as =H ({A, B}). Let the hash code be represented as HCQB1 for readability (read as hash code of the query block with ID=1).

The second query block represents an inner join between the first query block and data source C. This query block is given a unique identifier ID=2. This query block has one data source alias {C} and one child query block alias {SYS_BLOCK_HASH_HCQB1}. Hence, the hash is computed as =H ({C, SYS_BLOCK_HASH_HCQB1})

The following metadata is stored for usage in subsequent stages of compilation:

| Identifier | HashCode | Name/Alias |
|---|---|---|
| 1 | H({A, B}) = HCQB1 | SYS_BLOCK_HASH_HCQB1 |
| 2 | H({C, SYS_BLOCK_HASH_HCQB1}) = HCQB2 | SYS_BLOCK_HASH_HCQB2 |

Figure 21:
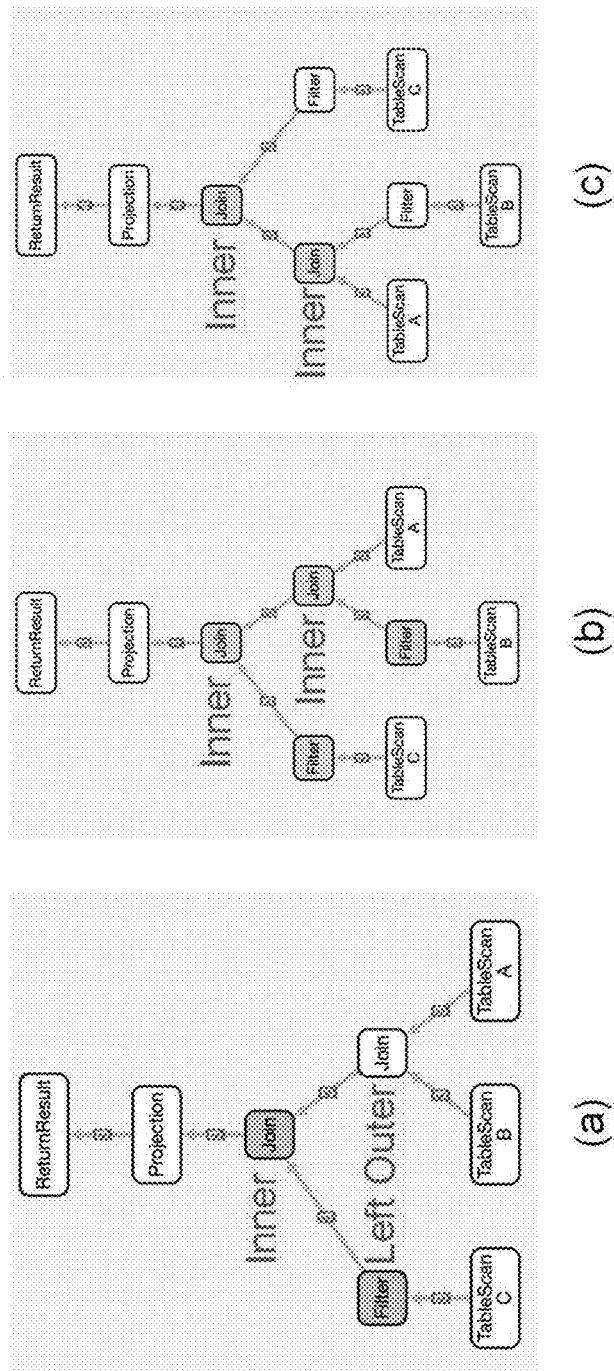
FIG. 21 illustrates different query plans after various stages of compilation for query 1900 of FIG. 19, in accordance with an embodiment of the subject technology.

FIG. 21 illustrates different query plans after various stages of compilation for query 1900 of FIG. 19, in accordance with an embodiment of the subject technology.

In FIG. 21, a first query plan (a) is initial query plan after query block translation, a second query plan (b) is a query plan after outer join to inner join conversion, and a third query plan (c) is a final query plan after cost-based optimization.

Figure 22:
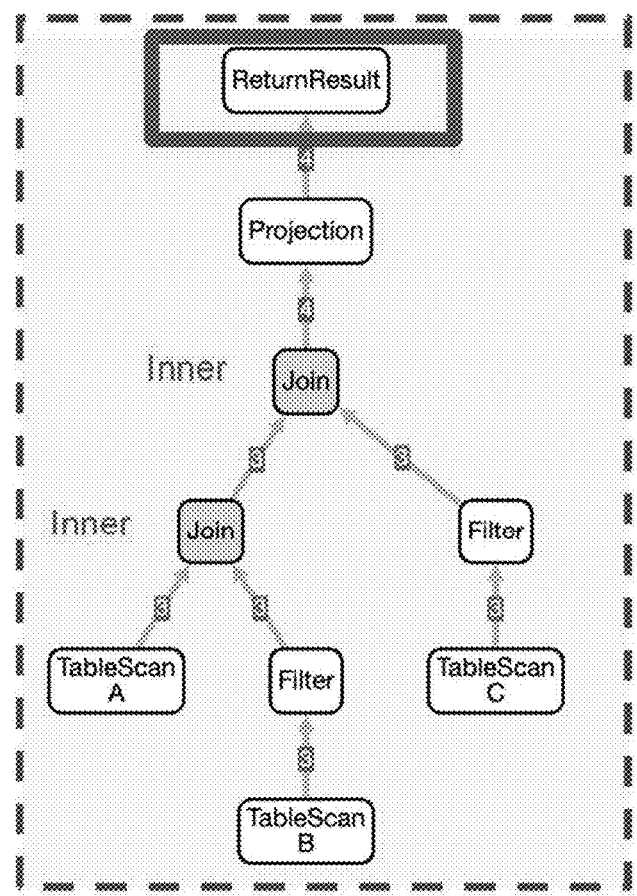
FIG. 22, illustrates query block roots and logical query blocks annotated on the final query plan from FIG. 21, in accordance with an embodiment of the subject technology.

FIG. 22, illustrates query block roots and logical query blocks annotated on the final query plan from FIG. 21, in accordance with an embodiment of the subject technology.

Since all the joins in the final query plan in FIG. 21(c) are inner joins, they are freely reorderable. As a result there is only 1 logical query block in this plan. As there is only 1 logical query block, there is only 1 root. The QueryPlanNodeReturnResult node represents the outermost query block by default as shown in FIG. 22.

For hash-based query block matching, in this logical query block, the data source aliases are={A,B,C} and child logical query block aliases are empty. The hash is computed as H ({A,B,C}). No matching hashcode is found in the stored metadata. In this example, this logical query block is assigned an ID=3. Let the hash code be represented as HCLQB3 for readability (read as hash code of the logical query block with ID=3). This is then given a system generated unique name SYS_LOGICAL_BLOCK_HASH HCLQB3.

The following relates to a summary of aspects of the subject technology discussed above.

1 Store query block boundary metadata: Before query block translation, parse-tree query blocks are given globally unique identifiers and globally unique names. Each query block is hashed to a unique hashcode using aliases present within. This metadata <Identifier, HashCode, Name> is stored for each query block for usage in subsequent stages of compilation.

2. Restore logical query block boundaries: A subset of query plan nodes called query block roots are used to restore the query block boundaries. Each query block root represents a fragment or region of the query plan within which joins are reorderable. Since these are not parse-tree query blocks, rather logically defined boundaries on a query plan, these are referred to as logical query blocks.

3. Hash-based query block matching: Each logical query block is hashed to a unique hashcode. A mapping is attempted between logical query block and parse-tree query block based on computed hashes.
 a. If the block boundary does not change during query compilation, a mapping can be established between a logical query block and a parse-tree query block.
 b. If a block boundary changes due to various optimizations (outer join to inner join conversion etc.) during query compilation, a mapping can not be established. Each logical query block without a matching parse-tree query block is then treated as a new logical query block. Each new logical query block is assigned a new identifier and a new name.

Figure 23:
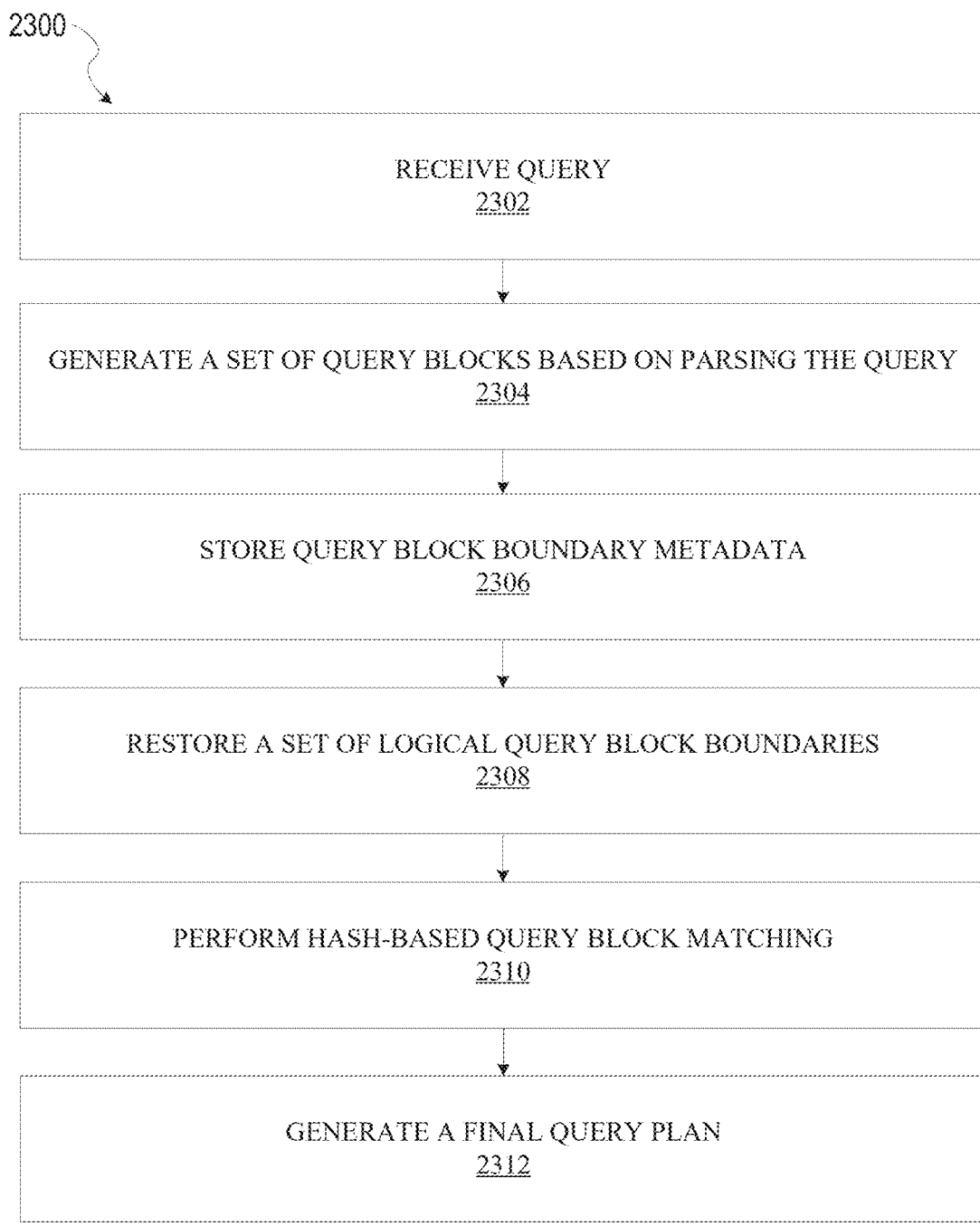
FIG. 23 is flow diagram illustrating operations of a database system in performing a method, in accordance with some embodiments of the present disclosure.

FIG. 23 is flow diagram illustrating operations of a database system in performing a method, in accordance with some embodiments of the present disclosure. The method 2300 may be embodied in computer-readable instructions for execution by one or more hardware components (e.g., one or more processors) such that the operations of the method 2300 may be performed by components of network-based data warehouse system 102, such as components of the compute service manager 108. Accordingly, the method 2300 is described below, by way of example with reference thereto. However, it shall be appreciated that the method 2300 may be deployed on various other hardware configurations and is not intended to be limited to deployment within the network-based data warehouse system 102.

At operation 2302, the hint engine 228 receives a query, the query including a set of statements.

At operation 2304, the hint engine 228 generates a set of query blocks based on parsing the query.

At operation 2306, the hint engine 228 stores query block metadata for each query block from the set of query blocks.

At operation 2308, the hint engine 228 restores a set of logical query block boundaries.

At operation 2310, the hint engine 228 performs a hash-based query block matching.

At operation 2312, the hint engine 228 generates, after performing the hash-based query block matching, a final query plan.

In an embodiment, each query block is assigned a unique identifier and unique name, and is hashed to a unique hash code, and the operations that the hint engine 228 perform further comprise: receiving a second query; generating a second set of query blocks based on parsing the second query; generating second query block metadata based on the second set of query blocks, the second query block metadata comprising at least a particular globally unique identifier, a particular unique name, and a particular unique hash code for each query block from the second set of query blocks; and determining that the second query is a same query as the query based on matching the second query block metadata to the query block metadata of the set of query blocks, the second query and the query corresponding to different executions of the same query.

In an embodiment, the hint engine 228 further performs: determining a first hash code of the query; receiving a second query; determining a second hash code of the second query; determining that the second query is a same query as the query based on matching the second hash code of the second query to the first hash code of the query, the second query and the query corresponding to different executions of the same query, the matching further performing matching the set of query blocks of the query to a particular set of query blocks of the second query across executions of the query and the second query.

Figure 24:
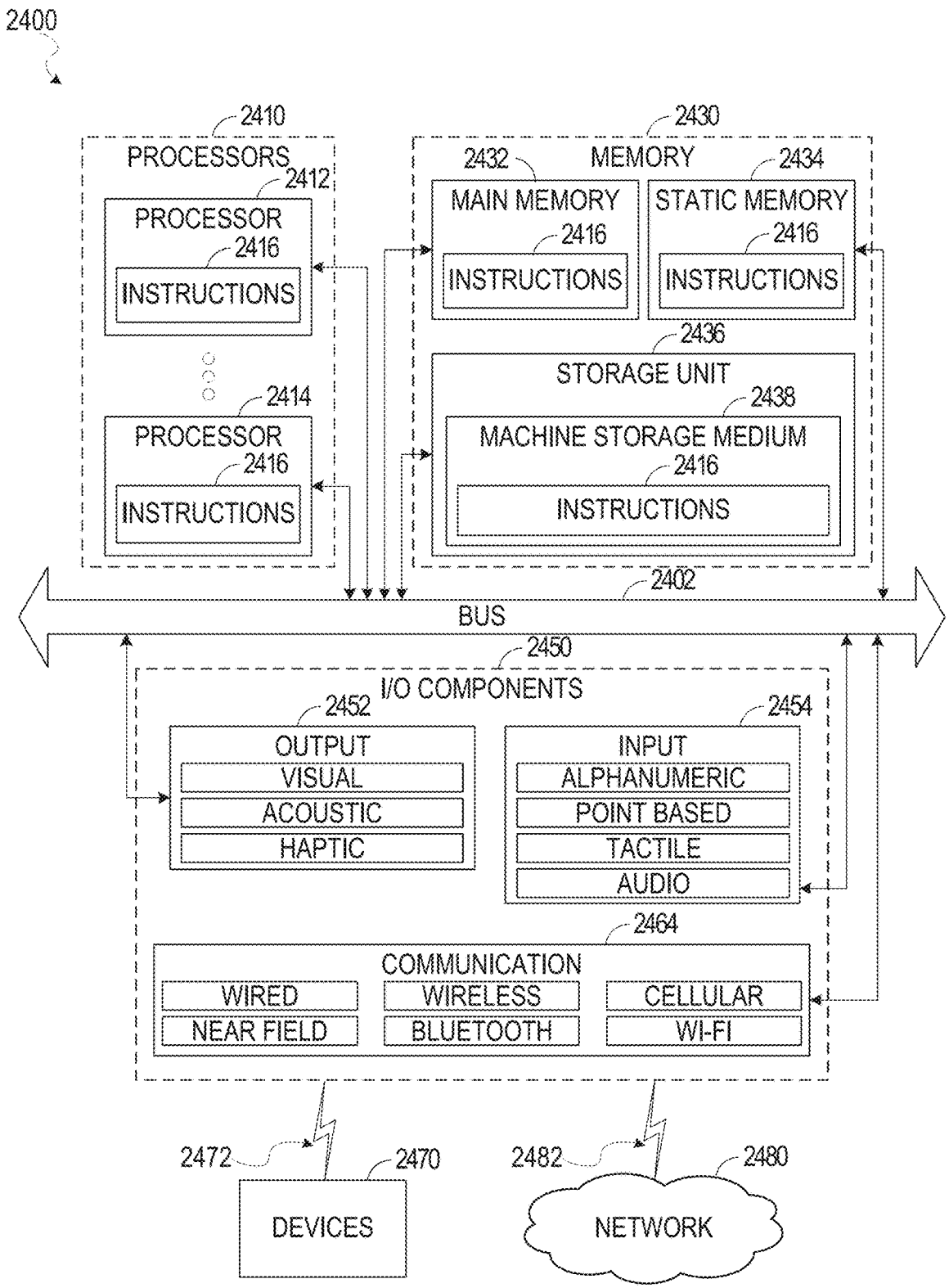
FIG. 24 illustrates a diagrammatic representation of a machine in the form of a computer system within which a set of instructions may be executed for causing the machine to perform any one or more of the methodologies discussed herein, in accordance with some embodiments of the present disclosure.

FIG. 24 illustrates a diagrammatic representation of a machine 2400 in the form of a computer system within which a set of instructions may be executed for causing the machine 2400 to perform any one or more of the methodologies discussed herein, according to an example embodiment. Specifically, FIG. 24 shows a diagrammatic representation of the machine 2400 in the example form of a computer system, within which instructions 2416 (e.g., software, a program, an application, an applet, an app, or other executable code) for causing the machine 2400 to perform any one or more of the methodologies discussed herein may be executed. For example, the instructions 2416 may cause the machine 2400 to execute any one or more operations of a method. In this way, the instructions 2416 transform a general, non-programmed machine into a particular machine 2400 (e.g., the compute service manager 108 or a node in the execution platform 110) that is specially configured to carry out any one of the described and illustrated functions in the manner described herein.

In alternative embodiments, the machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

The machine 2400 includes processors 2410, memory 2430, and input/output (I/O) components 2450 configured to communicate with each other such as via a bus 2402. In an example embodiment, the processors 2410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2412 and a processor 2414 that may execute the instructions 2416. The term "processor" is intended to include multi-core processors 2410 that may comprise two or more independent processors (sometimes referred to as "cores") that may execute instructions 2416 contemporaneously. Although FIG. 24 shows multiple processors 2410, the machine 2400 may include a single processor with a single core, a single processor with multiple cores (e.g., a multi-core processor), multiple processors with a single core, multiple processors with multiple cores, or any combination thereof.

The memory 2430 may include a main memory 2432, a static memory 2434, and a storage unit 2436, all accessible to the processors 2410 such as via the bus 2402. The main memory 2432, the static memory 2434, and the storage unit 2436 store the instructions 2416 embodying any one or more of the methodologies or functions described herein. The instructions 2416 may also reside, completely or partially, within the main memory 2432, within the static memory 2434, within machine storage medium 2438 of the storage unit 2436, within at least one of the processors 2410 (e.g., within the processor's cache memory), or any suitable combination thereof, during execution thereof by the machine 2400.

The I/O components 2450 include components to receive input, provide output, produce output, transmit information, exchange information, capture measurements, and so on. The specific I/O components 2450 that are included in a particular machine 2400 will depend on the type of machine. For example, portable machines such as mobile phones will likely include a touch input device or other such input mechanisms, while a headless server machine will likely not include such a touch input device. It will be appreciated that the I/O components 2450 may include many other components that are not shown in FIG. 24. The I/O components 2450 are grouped according to functionality merely for simplifying the following discussion and the grouping is in no way limiting. In various example embodiments, the I/O components 2450 may include output components 2452 and input components 2454. The output components 2452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2450 may include communication components 2464 operable to couple the machine 2400 to a network 2480 or devices 2470 via a coupling 2482 and a coupling 2472, respectively. For example, the communication components 2464 may include a network interface component or another suitable device to interface with the network 2480. In further examples, the communication components 2464 may include wired communication components, wireless communication components, cellular communication components, and other communication components to provide communication via other modalities. The devices 2470 may be another machine or any of a wide variety of peripheral devices (e.g., a peripheral device coupled via a universal serial bus (USB)). For example, as noted above, the machine 2400 may correspond to any one of the compute service manager 108 or the execution platform 110, and the devices 2470 may include the client device 114 or any other computing device described herein as being in communication with the network-based data warehouse system 102 or the cloud storage platform 104.

Executable Instructions and Machine Storage Medium

The various memories (e.g., 2430, 2432, 2434, and/or memory of the processor(s) 2410 and/or the storage unit 2436) may store one or more sets of instructions 2416 and data structures (e.g., software) embodying or utilized by any one or more of the methodologies or functions described herein. These instructions 2416, when executed by the processor(s) 2410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 2480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2416 may be transmitted or received over the network 2480 using a transmission medium via a network interface device (e.g., a network interface component included in the communication components 2464) and utilizing any one of a number of well-known transfer protocols (e.g., hypertext transfer protocol (HTTP)). Similarly, the instructions 2416 may be transmitted or received using a transmission medium via the coupling 2472 (e.g., a peer-to-peer coupling) to the devices 2470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2416 for execution by the machine 2400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a query, the query including a set of statements;
   generating a set of query blocks based on parsing the query, each query block being assigned a unique identifier and unique name;
   storing query block metadata for each query block from the set of query blocks;
   generating a set of logical query block boundaries;
   performing a hash-based query block matching; and
   generating, after performing the hash-based query block matching, a final query plan.

2. The system of claim 1, wherein storing query block metadata occurs prior to a query block translation process.

3. The system of claim 1, wherein the generating the set of logical query block boundaries occurs after a query block translation process.

4. The system of claim 1, wherein each query block is hashed to a unique hash code, and the operations further comprise:
   determining a first hash code of the query;
   receiving a second query;
   determining a second hash code of the second query; and
   determining that the second query is a same query as the query based on matching the second hash code of the second query to the first hash code of the query, the second query and the query corresponding to different executions of the same query, the matching further performing matching the set of query blocks of the query to a particular set of query blocks of the second query across executions of the query and the second query.

5. The system of claim 2, wherein the operations further comprise:
performing the query block translation process; and
generating, after performing the query block translation process, a first query plan.

6. The system of claim 1, wherein the operations further comprise:
identifying a set of query block roots included in the final query plan.

7. The system of claim 1, wherein restoring the set of logical query block boundaries comprises:
traversing the final query plan starting from a root node, the traversing comprising:
visiting each descendant node from the root node.

8. The system of claim 7, wherein the operations further comprise:
determining, during the traversing, that a particular query block root has been encountered; and
determining a set of nodes that have been visited prior to encountering the particular query block root.

9. The system of claim 8, wherein the operations further comprise:
generating a particular logical query block, the particular logical query block including the set of nodes, the particular logical query block being represented by the particular query block root.

10. The system of claim 1, wherein performing the hash-based query block matching comprises:
performing a lookup operation using a hashcode of a logical query block in the stored query block metadata.

11. A method comprising:
receiving a query, the query including a set of statements;
generating a set of query blocks based on parsing the query, each query block being assigned a unique identifier and unique name;
storing query block metadata for each query block from the set of query blocks;
generating a set of logical query block boundaries;
performing a hash-based query block matching; and
generating, after performing the hash-based query block matching, a final query plan.

12. The method of claim 11, wherein storing query block metadata occurs prior to a query block translation process.

13. The method of claim 11, wherein the generating the set of logical query block boundaries occurs after a query block translation process.

14. The method of claim 11, wherein each query block is hashed to a unique hash code, and the method further comprises:
determining a first hash code of the query;
receiving a second query;
determining a second hash code of the second query; and
determining that the second query is a same query as the query based on matching the second hash code of the second query to the first hash code of the query, the second query and the query corresponding to different executions of the same query, the matching further performing matching the set of query blocks of the query to a particular set of query blocks of the second query across executions of the query and the second query.

15. The method of claim 12, further comprising:
performing the query block translation process; and
generating, after performing the query block translation process, a first query plan.

16. The method of claim 11, further comprising:
identifying a set of query block roots included in the final query plan.

17. The method of claim 11, wherein restoring the set of logical query block boundaries comprises:
traversing the final query plan starting from a root node, the traversing comprising:
visiting each descendant node from the root node.

18. The method of claim 17, further comprising:
determining, during the traversing, that a particular query block root has been encountered; and
determining a set of nodes that have been visited prior to encountering the particular query block root.

19. The method of claim 18, further comprising:
generating a particular logical query block, the particular logical query block including the set of nodes, the particular logical query block being represented by the particular query block root.

20. A non-transitory computer-storage medium comprising instructions that, when executed by one or more processors of a machine, configure the machine to perform operations comprising:
receiving a query, the query including a set of statements;
generating a set of query blocks based on parsing the query, each query block being assigned a unique identifier and unique name;
storing query block metadata for each query block from the set of query blocks;
generating a set of logical query block boundaries;
performing a hash-based query block matching; and
generating, after performing the hash-based query block matching, a final query plan.

\* \* \* \* \*